US012311393B2

(12) United States Patent
Alluigi

(10) Patent No.: US 12,311,393 B2
(45) Date of Patent: May 27, 2025

(54) DISPENSING HEAD FOR A TRIGGER DISPENSER

(71) Applicant: GUALA DISPENSING S.P.A., Alessandria (IT)

(72) Inventor: Riccardo Alluigi, Alessandria (IT)

(73) Assignee: Guala Dispensing S.P.A., Spinetta Marengo (IT)

( * ) Notice: Subject to any disclaimer, the term of this patent is extended or adjusted under 35 U.S.C. 154(b) by 482 days.

(21) Appl. No.: 17/768,971

(22) PCT Filed: Oct. 25, 2019

(86) PCT No.: PCT/IT2019/000084

§ 371 (c)(1),
(2) Date: Apr. 14, 2022

(87) PCT Pub. No.: WO2021/079387

PCT Pub. Date: Apr. 29, 2021

(65) Prior Publication Data

US 2023/0142585 A1 May 11, 2023

(51) Int. Cl.
*B05B 11/10* (2023.01)

(52) U.S. Cl.
CPC ........ *B05B 11/1069* (2023.01); *B05B 11/104* (2023.01)

(58) Field of Classification Search
CPC ............... B05B 11/1069; B05B 11/104; B05B 11/1064; B05B 11/1011; B05B 11/0008; B05B 11/0044
See application file for complete search history.

(56) References Cited

U.S. PATENT DOCUMENTS

| | | | | |
|---|---|---|---|---|
| 4,155,487 | A | 5/1979 | Blake | |
| 10,315,208 | B2 * | 6/2019 | Rech | B05B 11/1011 |
| 2010/0219207 | A1 | 9/2010 | Canfield | |
| 2012/0014824 | A1 * | 1/2012 | Han de Man | A47K 5/1208 417/472 |
| 2015/0190828 | A1 * | 7/2015 | Alluigi | B05B 11/1011 239/526 |
| 2019/0134654 | A1 * | 5/2019 | Sweeton | B05B 11/1011 |

FOREIGN PATENT DOCUMENTS

| | | | |
|---|---|---|---|
| EP | 1137493 | A1 | 10/2001 |
| WO | 2004065021 | A1 | 8/2004 |
| WO | 2012069939 | A1 | 5/2012 |
| WO | 2017115159 | A1 | 7/2017 |

OTHER PUBLICATIONS

International Search Report and Written Opinion for International Patent Application No. PCT/IT2019/000084, mailed Jul. 16, 2020.

* cited by examiner

*Primary Examiner* — Qingzhang Zhou
(74) *Attorney, Agent, or Firm* — Armstrong Teasdale LLP

(57) ABSTRACT

A dispensing head for a trigger dispenser includes a frame having a functional zone on which a frame port, a suction outlet port and a dispensing inlet port open. A valve device applied to the functional zone includes a suction shutter and a dispensing shutter that implements a precompression of products before dispensing. The valve device cooperates with a reference plane of the frame to form a precompression chamber upstream of the dispensing inlet port.

14 Claims, 21 Drawing Sheets

FIG5.c

DISPENSING HEAD FOR A TRIGGER DISPENSER

CROSS-REFERENCE TO RELATED APPLICATIONS

This application is a National Stage Application of International Patent Application No. PCT/IT2019/000084, having an International Filing Date of Oct. 25, 2019, the entire contents of which are hereby incorporated by reference herein.

FIELD OF THE INVENTION

The present invention relates to a dispensing head for a trigger dispenser. In particular, the present invention relates to a dispensing head provided with precompression valve means.

BACKGROUND OF THE INVENTION

Trigger dispensers are widespread on the market and used to spray liquid products for the most diverse uses: products for the hygiene of the home, for the perfuming of the rooms, for the ironing of fabrics, for gardening, and the like.

Every year some hundreds of millions of pieces are produced. It is therefore a sector in which a small improvement, such as to make production more cost-effective, is able to bring a considerable advantage.

The present invention, in particular, is directed to a dispensing head provided with precompression means which allow the dispensing of the product present in a precompression chamber only when a predefined threshold pressure is exceeded in said chamber.

This feature is extremely appreciated by the market, as the product is dispensed more efficiently, for example by allowing finer nebulization.

However, the known solutions of trigger dispensers with precompression means are often complex and therefore expensive.

OBJECT OF THE INVENTION

The object of the present invention is to provide a trigger dispenser with precompression means which meets the requirements of the field and at the same time overcomes the drawbacks mentioned above with reference to the prior art.

Such an object is achieved by a dispensing head as described and claimed herein. Advantageous embodiment variants are also described.

BRIEF DESCRIPTION OF THE DRAWINGS

The features and the advantages of the dispensing head according to the present invention will appear more clearly from the following description, made by way of an indicative and non-limiting example with reference to the accompanying figures, in which:

FIG. 5*c* is an enlargement of a region of FIG. 5*a;*

FIRST EMBODIMENT OF THE INVENTION

Figure 1:
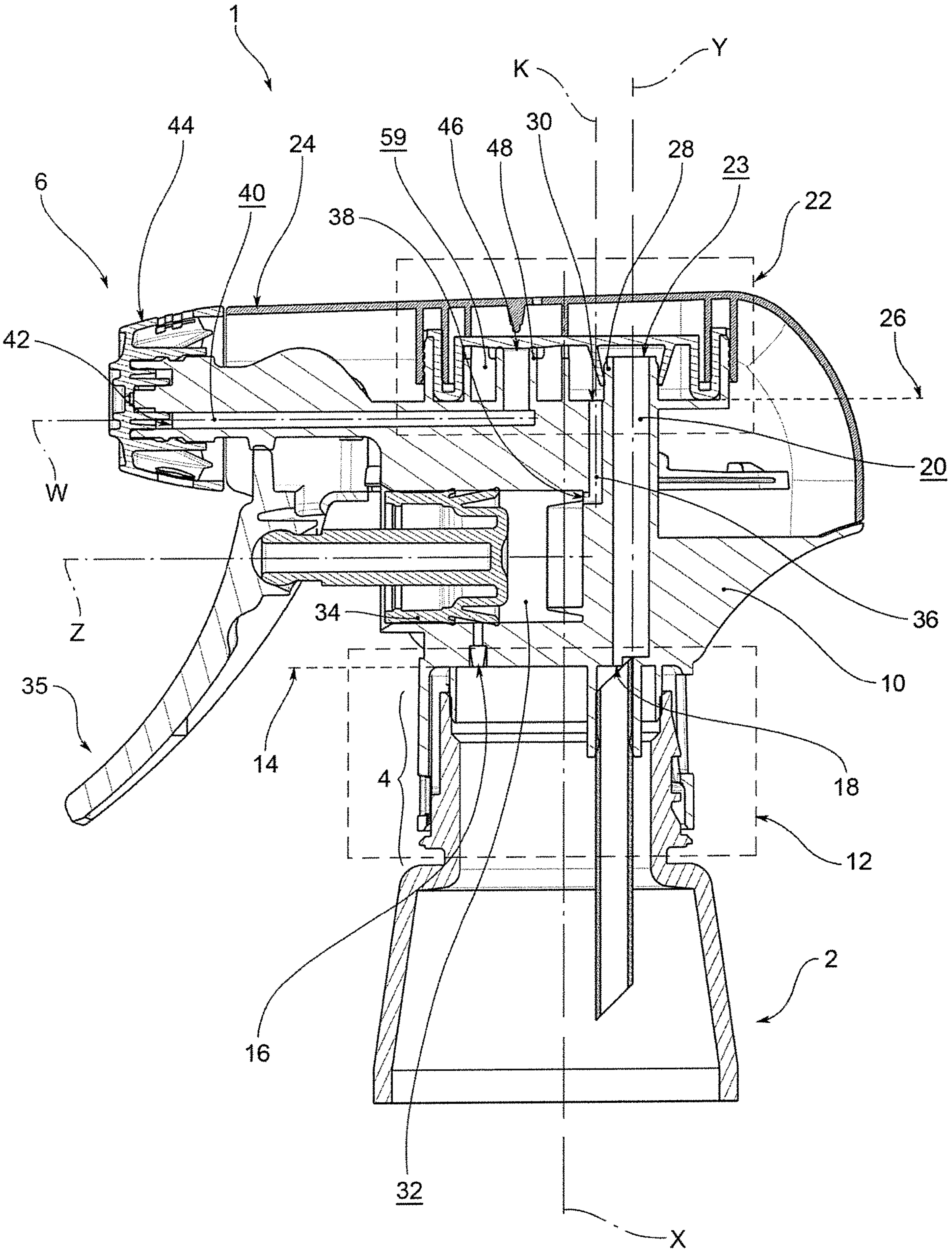
FIG. 1 shows a sectional view of a dispensing head according to an embodiment of the invention, in a rest configuration.
Figure 2:
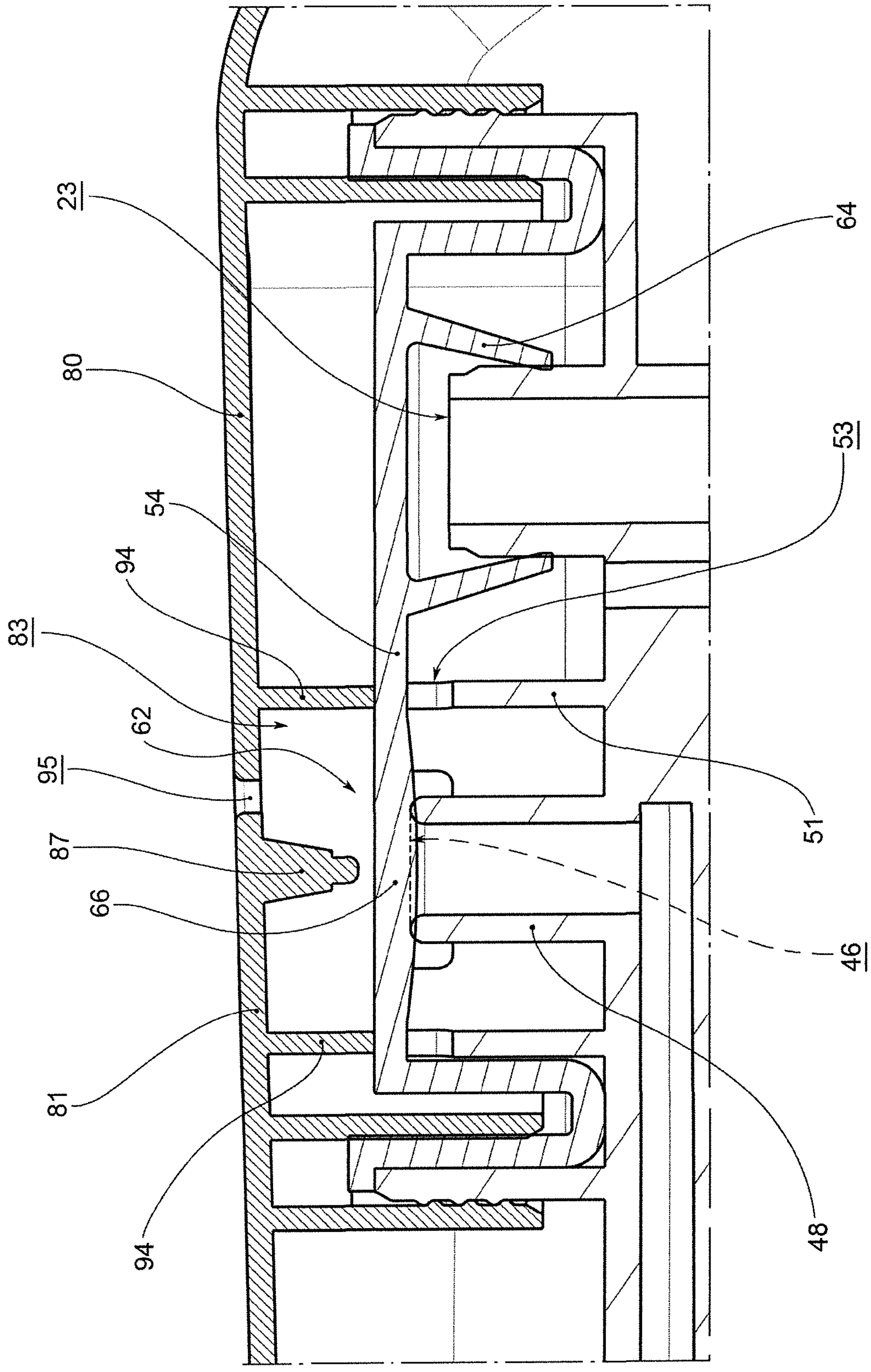
FIG. 2 shows an enlargement of an upper zone of a frame of the dispensing head of FIG. 1.
Figure 3:
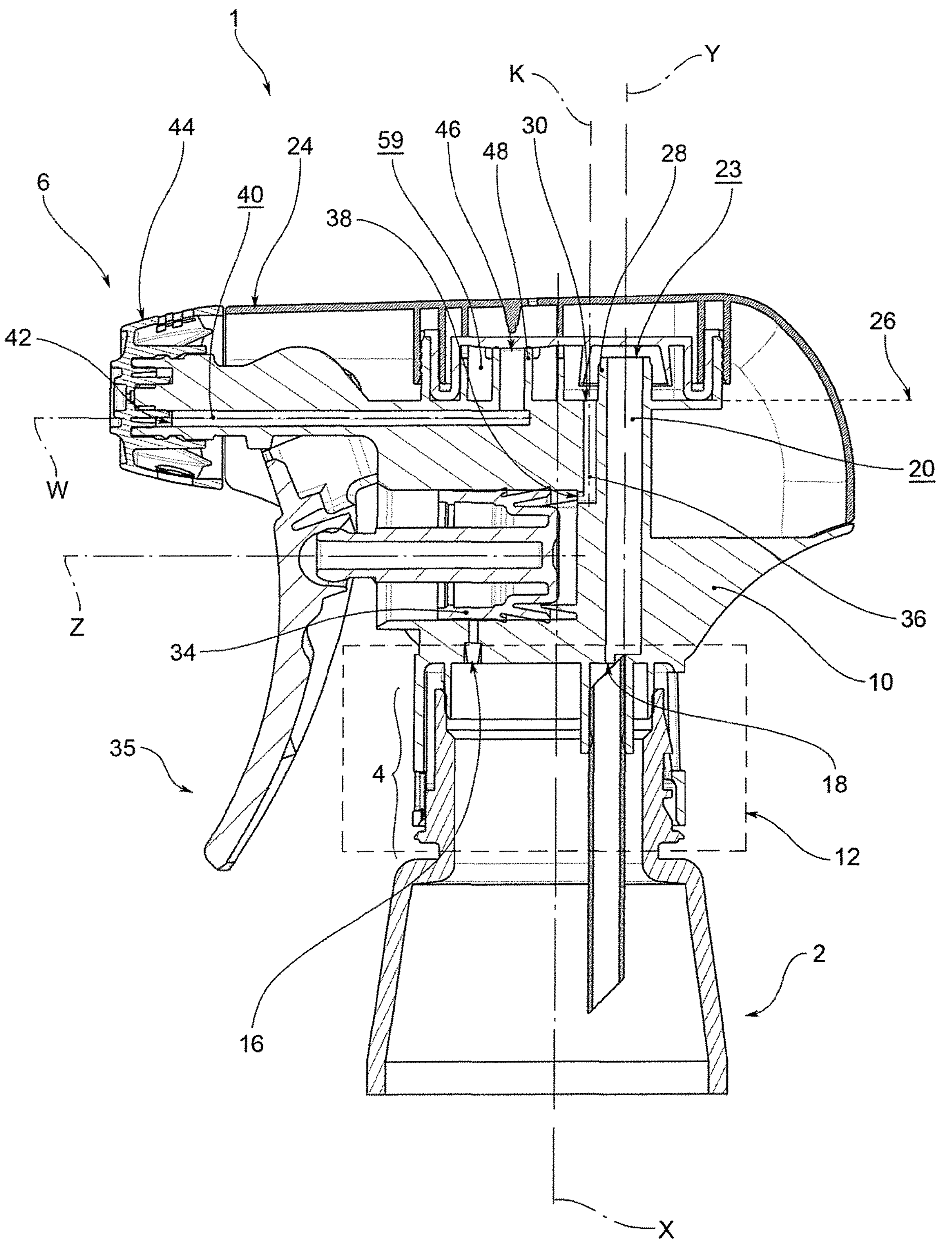
FIG. 3 shows the dispensing head of FIG. 1, in a suction configuration.
Figure 4:
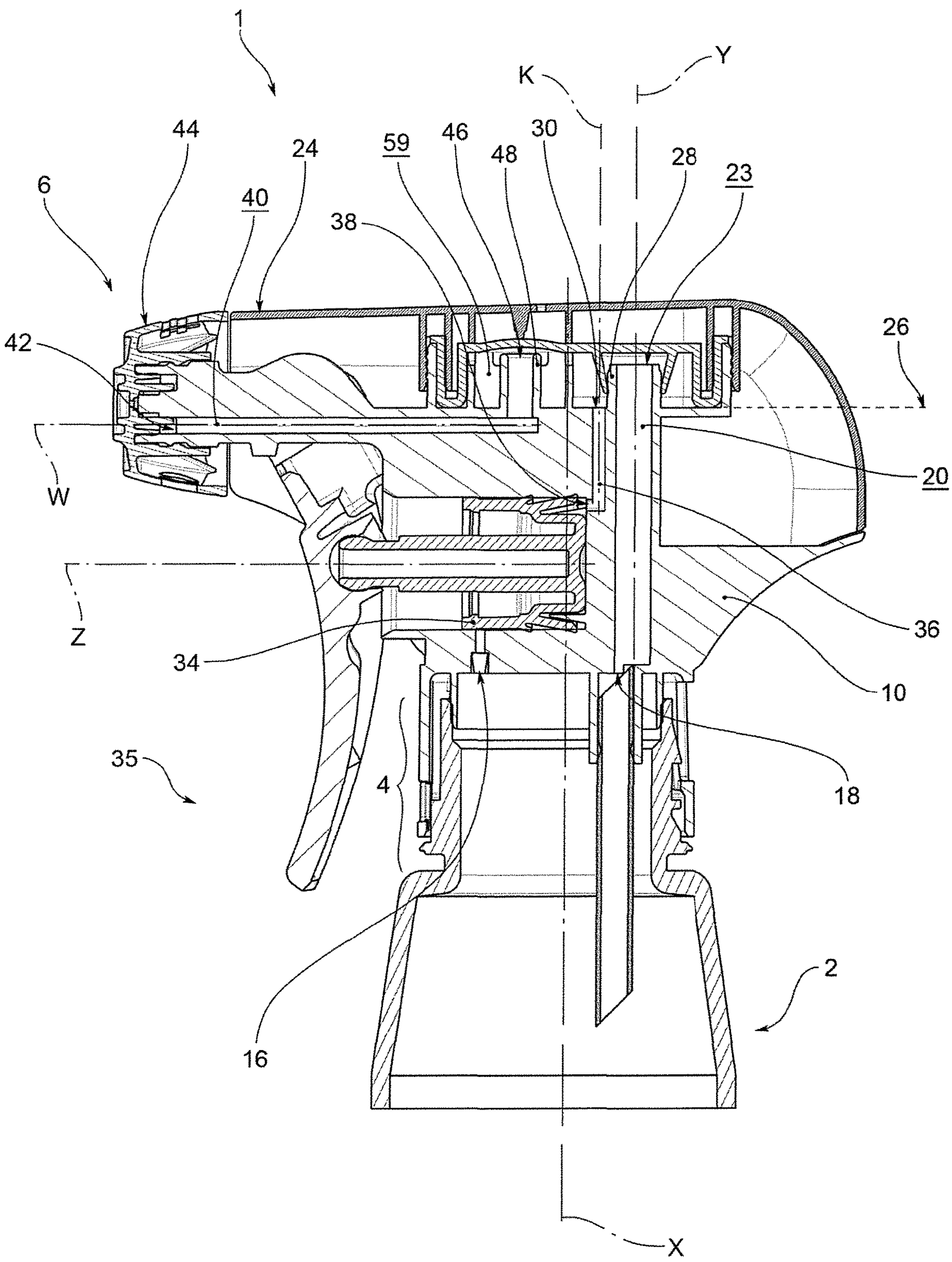
FIG. 4 shows the dispensing head of FIG. 1, in a dispensing configuration.
Figure 5B:
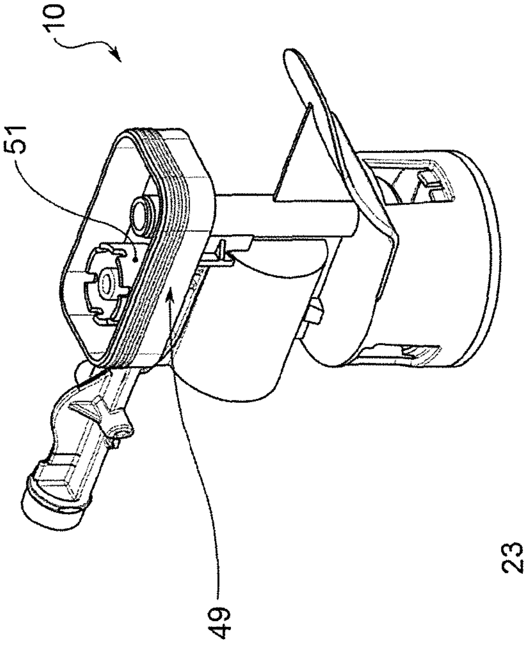
FIGS. 5*a* and 5*b* show a frame of the dispensing head of FIG. 1.
Figure 5A:
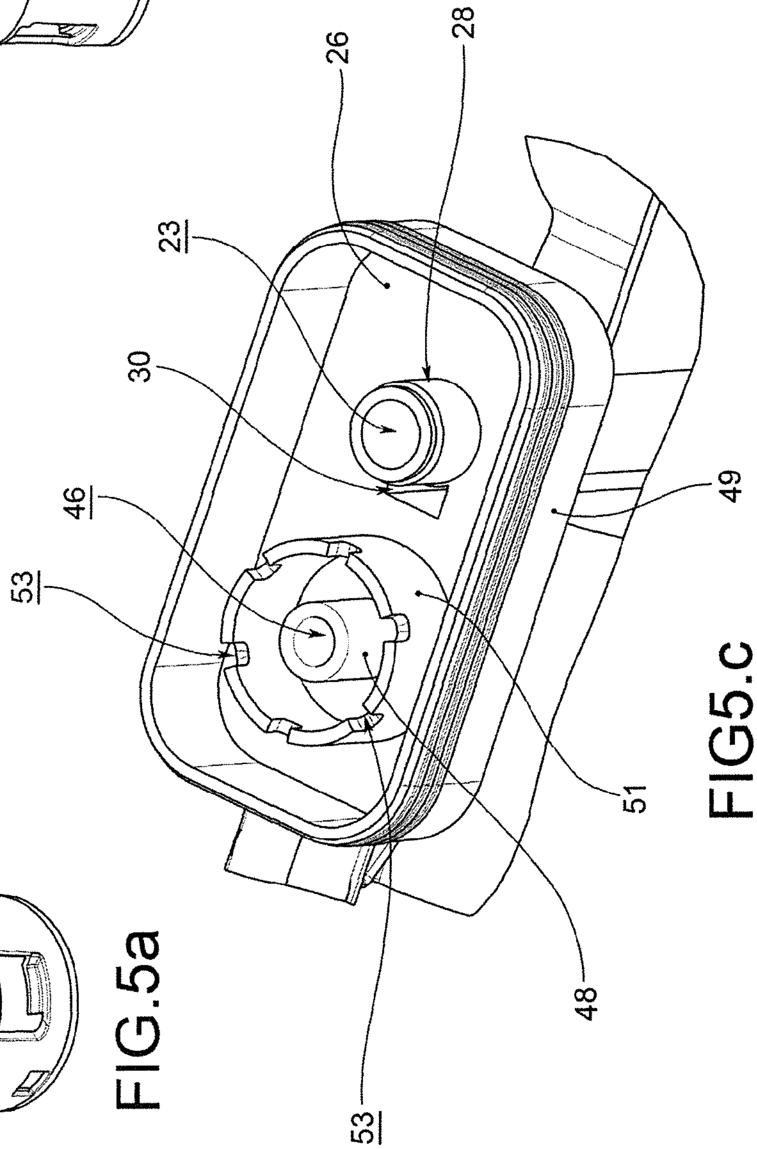
Figure 5A:
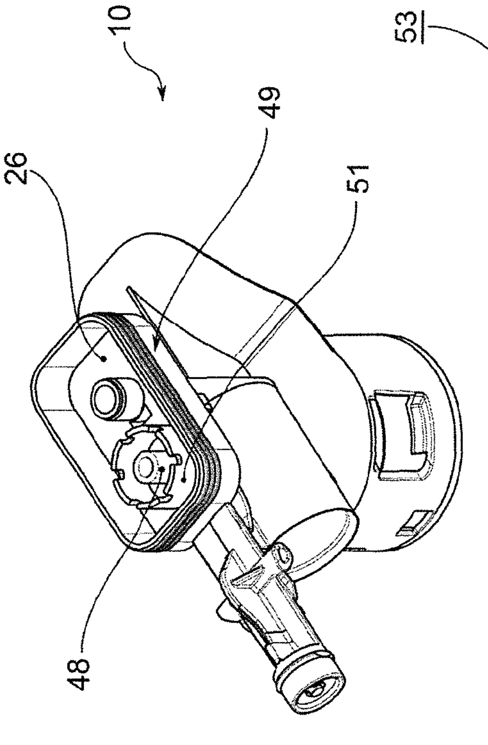
Figure 6A:
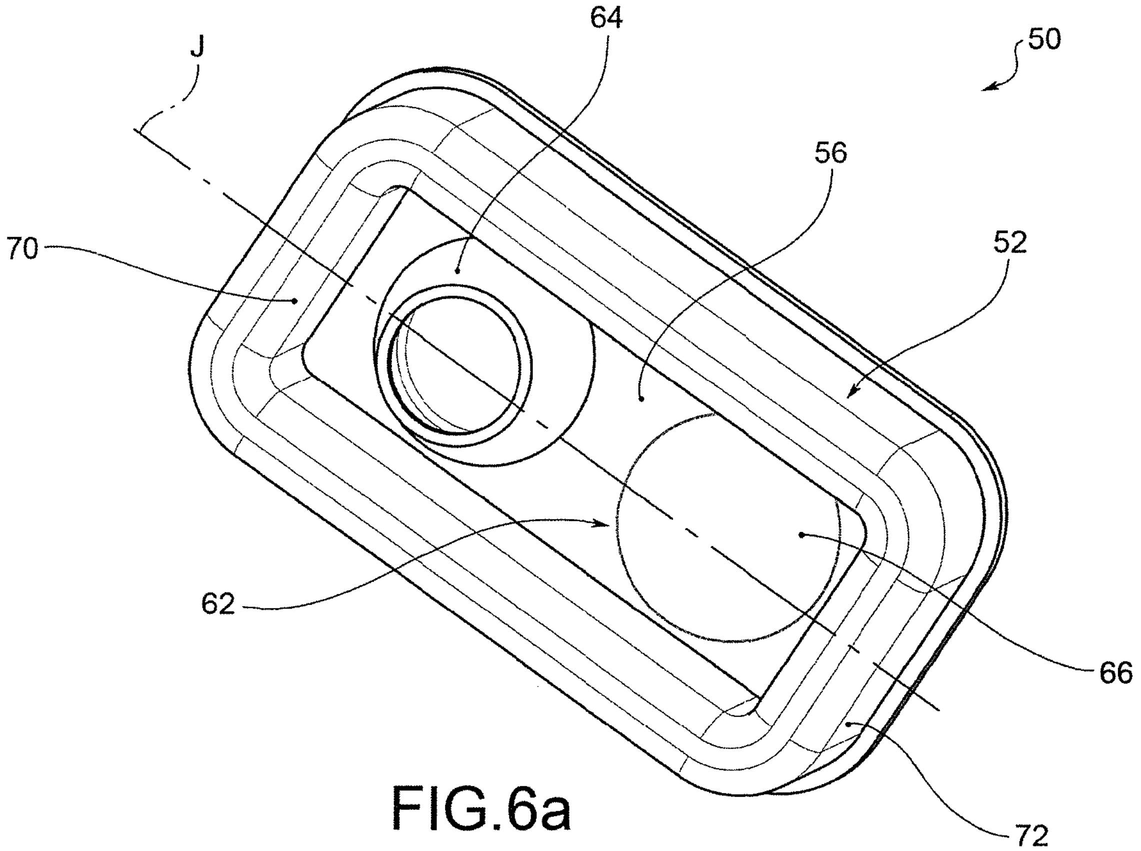
FIGS. 6*a* and 6*b* show valve means of the dispensing head of FIG. 1.
Figure 6B:
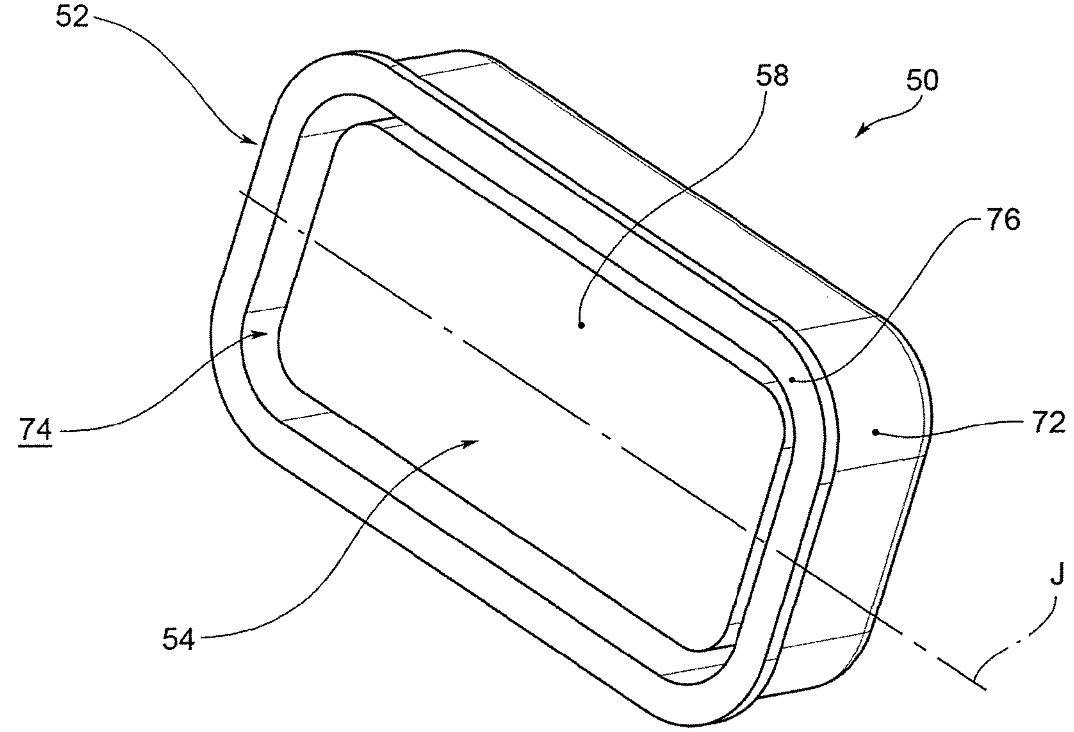
Figure 7:
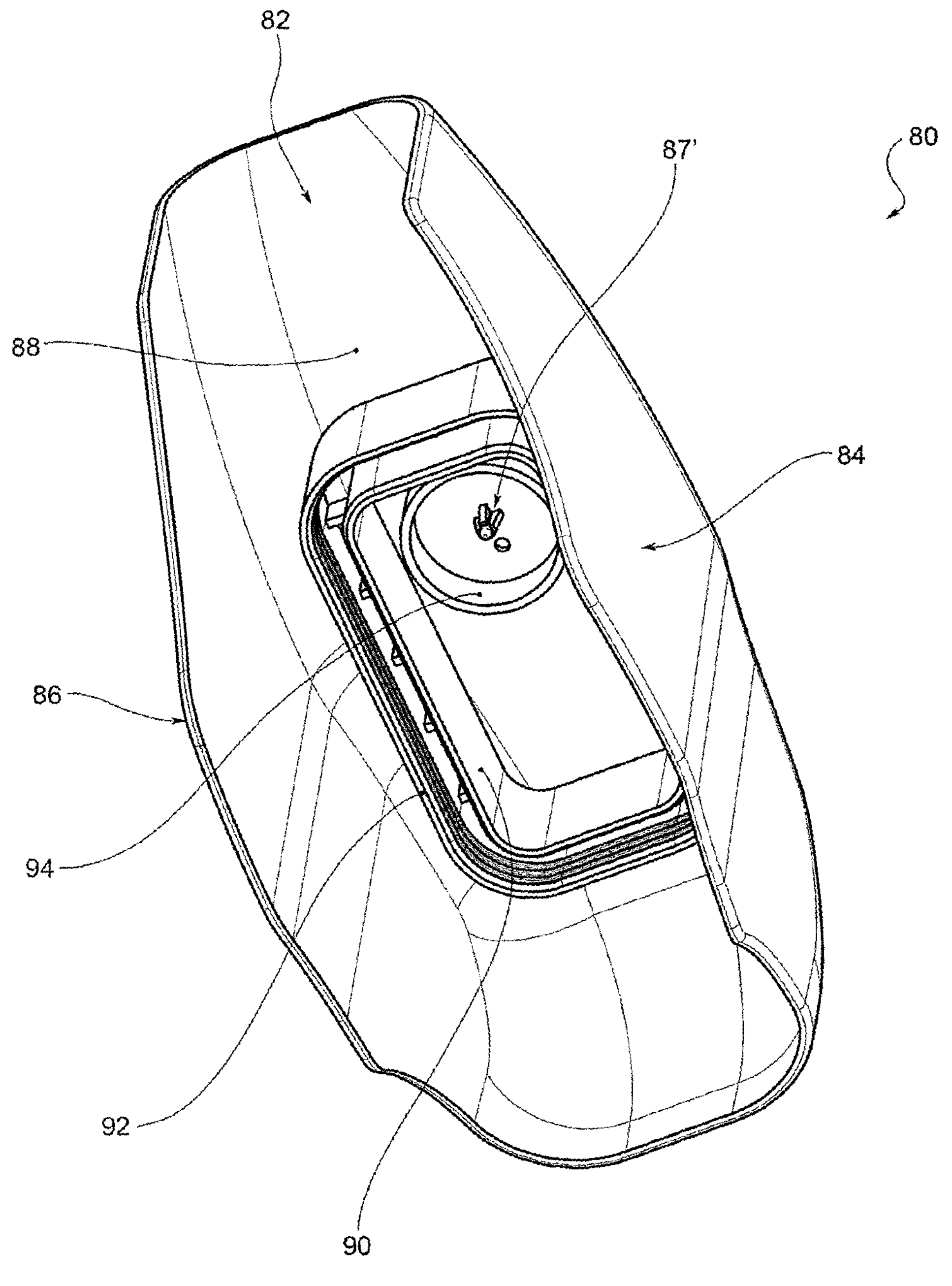
FIG. 7 shows a cover of the dispensing head of FIG. 1.

With reference to a first embodiment of the invention (FIGS. 1 to 7), a trigger dispenser 1 comprises a bottle 2, provided with a neck 4 having a central axis X, and a dispensing head 6, applicable to the neck 4, for example via a threaded connection or a bayonet fitting.

The dispensing head 6 comprises a frame 10, preferably made in a single piece, of plastic material, for example polypropylene, obtained by injection molding.

The frame 10 comprises a lower region 12 intended for mechanical coupling with the neck 4 of the bottle 2, having a lower reference plane 14 which, when the dispensing head 6 is applied to the bottle 2, is substantially perpendicular to the central axis X of the neck 4.

The lower surface 14 has a venting outlet port 16, which can be connected with the environment outside the device 1 for the entry of air into the bottle 2, and a suction inlet port 18 for suctioning the product from the bottle 2.

The frame 10 also internally has a suction duct 20 extending along a suction axis Y, incident to the lower plane 14, for example orthogonal thereto.

A functional zone or upper zone 22 of the frame 10, intended for the connection of the frame 10 with a cover 24 which will be discussed later, has a suction outlet port 23 and the suction duct 20 extends from the suction inlet port 18 to the suction outlet port. 23.

Preferably, the upper zone 22 provides a reference first plane or upper plane 26 on which the suction duct 20 opens, through a suction shank 28.

The upper zone 22 also has a frame port 30, for example made on the upper plane 26.

According to a preferred embodiment, the frame 10 has a pressure chamber 32, inside which a piston 34 can be sealedly slidable along a piston axis Z.

The lower zone 12 and the upper zone 22 are on opposite sides of the piston axis Z.

The dispensing head 6 further comprises a trigger 35, preferably hinged to the frame 10, operable by a user, operatively connected to the piston 34, so as to operate it in translation in the pressure chamber 32 for dispensing the product, between a limit dispensing position and a rest position.

The dispensing head 6 also comprises elastic return means (not shown), adapted to operate permanently on the trigger 35 to bring it towards the rest position.

Preferably, the elastic return means are integrated in the trigger structure, i.e. formed in a single piece therewith, for example according to what is illustrated in International Application WO-A1-2017/115159 in the name of the Applicant, whose specific teaching is herein explicitly incorporated.

A main duct 36, preferably extending along a main duct axis K, parallel to and spaced from the suction axis Y, puts the frame port 30 in communication with a chamber port 38 which opens into the pressure chamber 32.

The frame 10 further comprises a dispensing duct 40, extending along a dispensing axis W, terminating at the front with a dispensing output port 42.

In other words, preferably, the main duct 36 extends along the main duct axis K, the suction duct 20 extends along the suction axis Y and the main duct axis K is parallel to and spaced from the suction axis Y. Moreover, the dispensing duct 40 extends along the dispensing axis W, orthogonal to the suction axis Y and to the main duct axis K.

The dispensing head 6 further comprises a nozzle 44, applicable to the frame 10 at the dispensing outlet port 42 of the dispensing duct 40, to close it or to diffuse the product in the external environment according to predetermined patterns.

The upper zone 22 of the frame 10 also has a dispensing inlet port 46 in communication with the dispensing duct 40; preferably, said dispensing inlet port opens at the top of a dispensing shank 48, protruding from the upper plane 26.

The upper zone 22 of the frame 10 further comprises a frame wall 49 protruding from the upper plane 26, which surrounds the suction shank 28 and the dispensing shank 48.

Preferably, moreover, the dispensing shank 48 is surrounded by a chamber wall or constraining wall 51, protruding from the upper plane 26, provided with openings 53 along the free end edge.

The dispensing head 6 further comprises valve means 50, preferably one-piece, applicable to the frame 10 and suitable for regulating the suction and dispensing of the product. Said valve means 50 are engaged with the upper zone 22 of the frame 10, and in particular with the frame wall 49.

Preferably, the valve means 50 are made in a single piece, for example in POP (POlyolefin Plastomer), by injection molding.

Said valve means 50 comprise a valve body 52, preferably elongated along a longitudinal axis J, for example of rectangular shape.

The valve body 52 comprises a bottom 54, having an inner face 56, which when the valve body 52 is applied to the frame 10 faces the upper plane 26, and an opposite outer face 58.

Once the body 52 has been applied to the upper zone 22 of the frame 10, the constraining wall 51, the bottom 54 and the upper plane 26 delimit a precompression chamber 59, upstream of the dispensing inlet port 46 and downstream of the suction outlet port 23.

The valve means 50 also comprise a suction shutter 60 and a dispensing shutter 62, preferably made in a single piece with the valve body 52, protruding from the inner face 56 of the bottom 54.

Preferably, the suction shutter 60 consists of a truncated-cone annular wall 64, adapted to be inserted on the suction shank 28 of the upper zone 22, which is sufficiently flexible to deform due to the suction of the product.

In particular, the suction shank 28 is inserted inside the annular wall 64, which, at rest, adheres to the outer surface of said suction shank 28.

During the suction step (FIG. 3), the annular wall 64 is detached from the outer surface of the suction shank 28, allowing the product coming from the suction duct 20 to pass towards the pressure chamber 32, through the frame port 30 and the main duct 36; during the dispensing step (FIG. 4), the annular wall 64, by the action of the product pressure, continues to adhere to the outer surface of the suction shank 28, preventing the product from returning into the bottle through the suction duct 20.

The dispensing shutter 62, preferably, consists of a portion 66 of the bottom 56, adapted to close, at rest, the dispensing inlet 46 of the dispensing shank 48, adhering to the edge thereof.

During the dispensing step (FIG. 4), when the pressure of the product in the precompression chamber 59 exceeds a predefined threshold value, the portion 66 rises and becomes detached from the edge of the dispensing inlet port 46, allowing the product to pass towards the dispensing duct 40; during the suction step (FIG. 3), the portion 66 instead remains adherent to the edge of the dispensing inlet port 46, which thus remains closed, preventing air from the external environment from being suctioned through the dispensing duct 40.

The valve body 52 further comprises:

- an inner perimeter wall 70, protruding from the bottom 54 on the side of the inner face 56, which surrounds the suction shutter 60 and the dispensing shutter 62;
- an outer perimeter wall 72, which surrounds the inner perimeter wall 70, at a predefined distance, so as to form a perimeter pocket 74.

At the end of the outer perimeter wall 72, there is a perimeter shelf 76 protruding externally, orthogonally to the outer perimeter wall 72; when the valve body 52 is applied to the frame wall 49, the perimeter shelf 76 rests on said frame wall 49, while the outer perimeter wall 72 of the valve body 52 abuts on the frame wall 49.

The dispensing head 6 also comprises a cover 80 suitable for being applied to the frame 10 to cover the upper zone 22, up to the nozzle 44.

The cover 80 comprises a cap 82 and sides 84, 86; the cap 82 has an exposed outer surface and an inner surface 88.

The cover 80 comprises an annular inner cap wall 90 and an annular outer cap wall 92, protruding from the inner surface 88, between which the outer perimeter wall 72 of the valve body 52 and the frame wall 49 are forcedly forced. The inner cap wall 90 and the outer cap wall 92 thus form an example of connecting means for connecting the valve means to the upper zone 22 of the frame 10.

Moreover, the cover 80 comprises an annular counter-wall 94, for example continuous or continuous in sections, protruding from the inner surface 88, configured so as to overlap the constraining wall 51 of the upper zone 22 of the frame.

When the valve body 50 is applied to the upper zone 22 of the frame 10, the bottom 54, and in particular the portion 66 which implements the dispensing shutter 62, is against the free edge of the dispensing shank 48; when the cover 80 is applied, the inner cap wall 90 and the outer cap wall 92 clamp the outer perimeter wall 72 of the valve body 52 and the frame wall 49, while the counter-wall 94 is positioned above the constraining wall 51, pressing the bottom 54 against this.

Advantageously, this configuration allows creating an almost interlocking constraint around the portion 66 which constitutes the dispensing shutter 61, so that this portion 66 operates effectively for the precompression. The product passes through said constraining wall 51 due to the openings 53.

The bottom 54 of the valve body 52, the counter-wall 94 which is tightly coupled with the bottom 54 and an auxiliary portion 81 of the cap 82 of the cover 80, define an auxiliary compartment 83.

The cover 80 is also provided with a venting hole 95, made through the thickness of said auxiliary portion 81 of the cover 80; said venting hole 95 allows the escape of the air from the auxiliary compartment 83 during the dispensing step, i.e. during the lifting of the portion 66 of the bottom 54 which closes the dispensing inlet port 46.

Said venting hole 95 therefore provides an example of venting means integrated in the cover 80, suitable for the escape of air from the auxiliary compartment 83 during the product dispensing step.

Preferably, moreover, the cover 80 comprises a shutter abutment 87 protruding from the inner surface 88 and suitable for implementing a travel end abutment for the portion 66 of the bottom 54 during the dispensing step.

Said shutter abutment 87 provides an example of abutment means integrated in the cover 80, suitable for providing a travel end abutment for the dispensing shutter during the dispensing step.

Second Embodiment of the Invention

Figure 8:
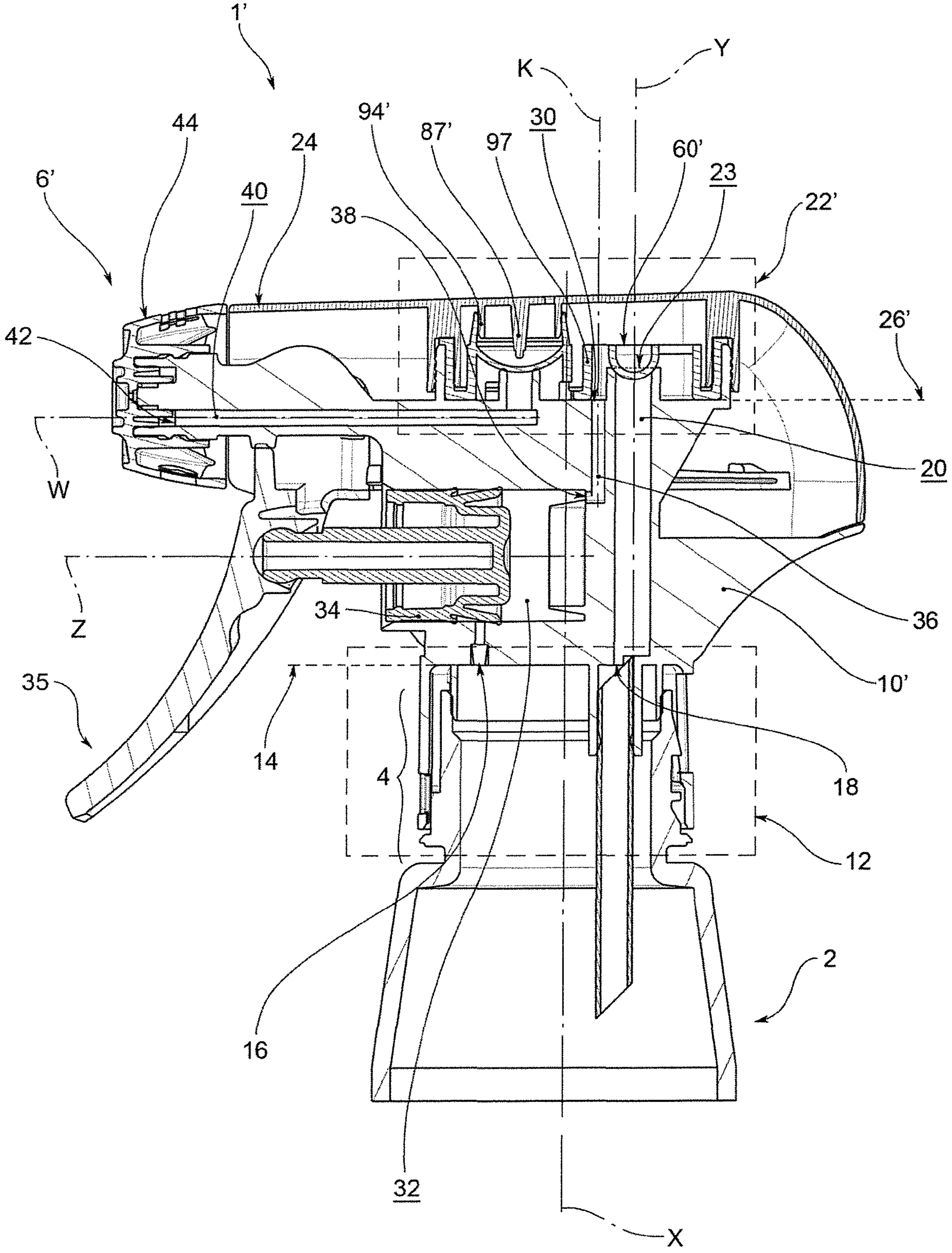
FIG. 8 shows a sectional view of a dispensing head according to a further embodiment of the invention, in a rest configuration.
Figure 9:
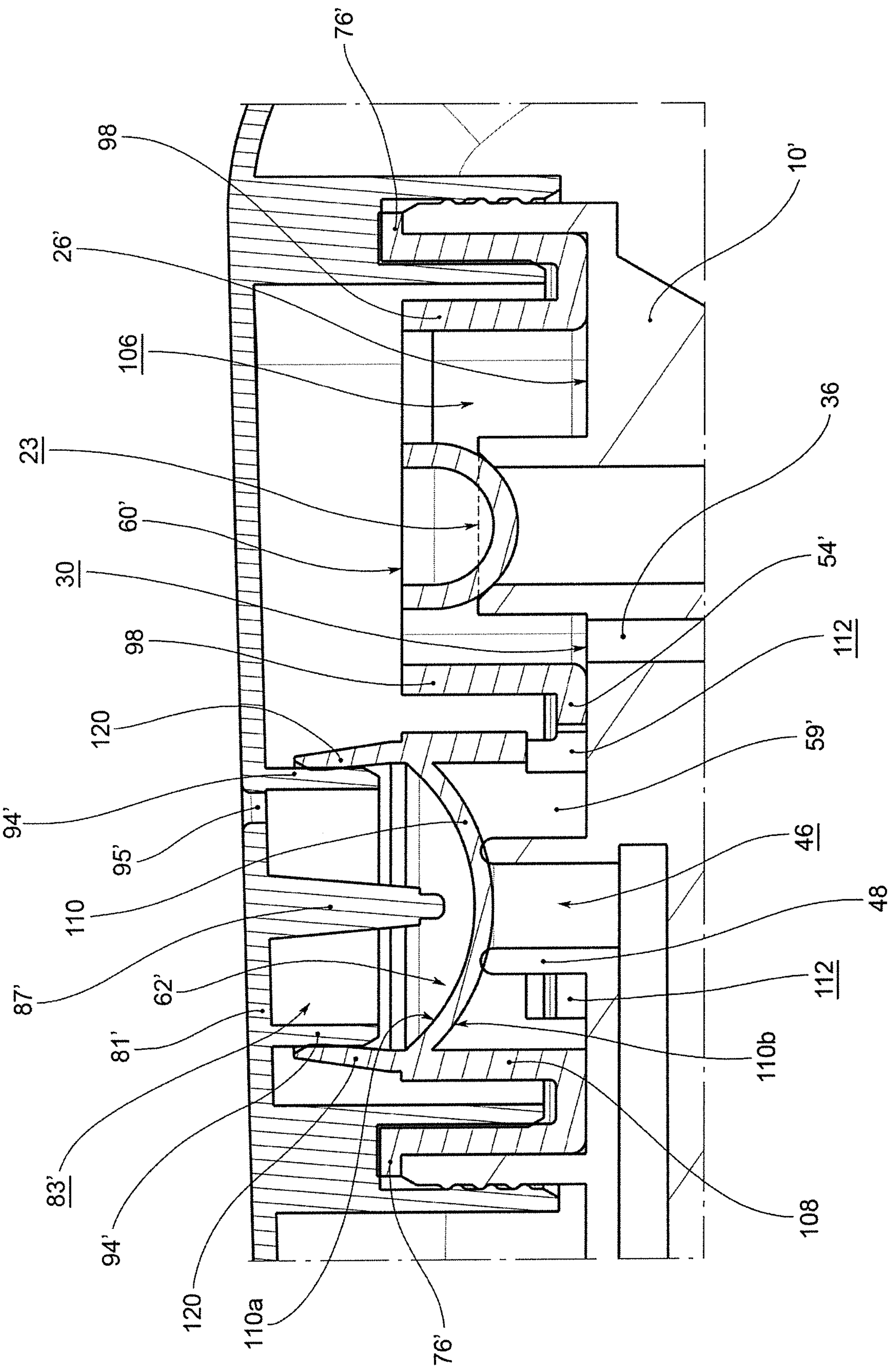
FIG. 9 shows an enlargement of an upper zone of a frame of the dispensing head of FIG. 8.
Figure 10:
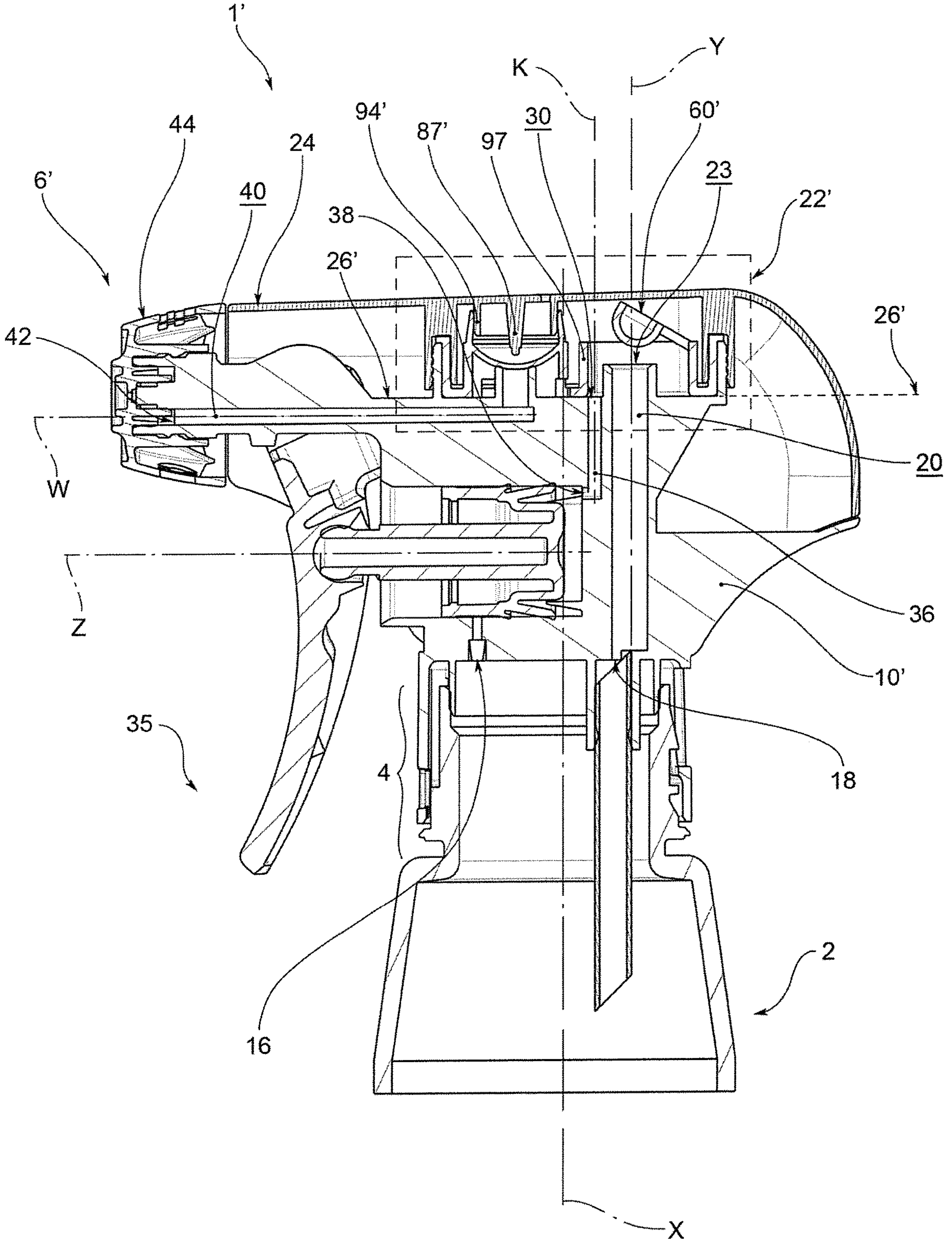
FIG. 10 shows the dispensing head of FIG. 8, in a suction configuration.
Figure 11:
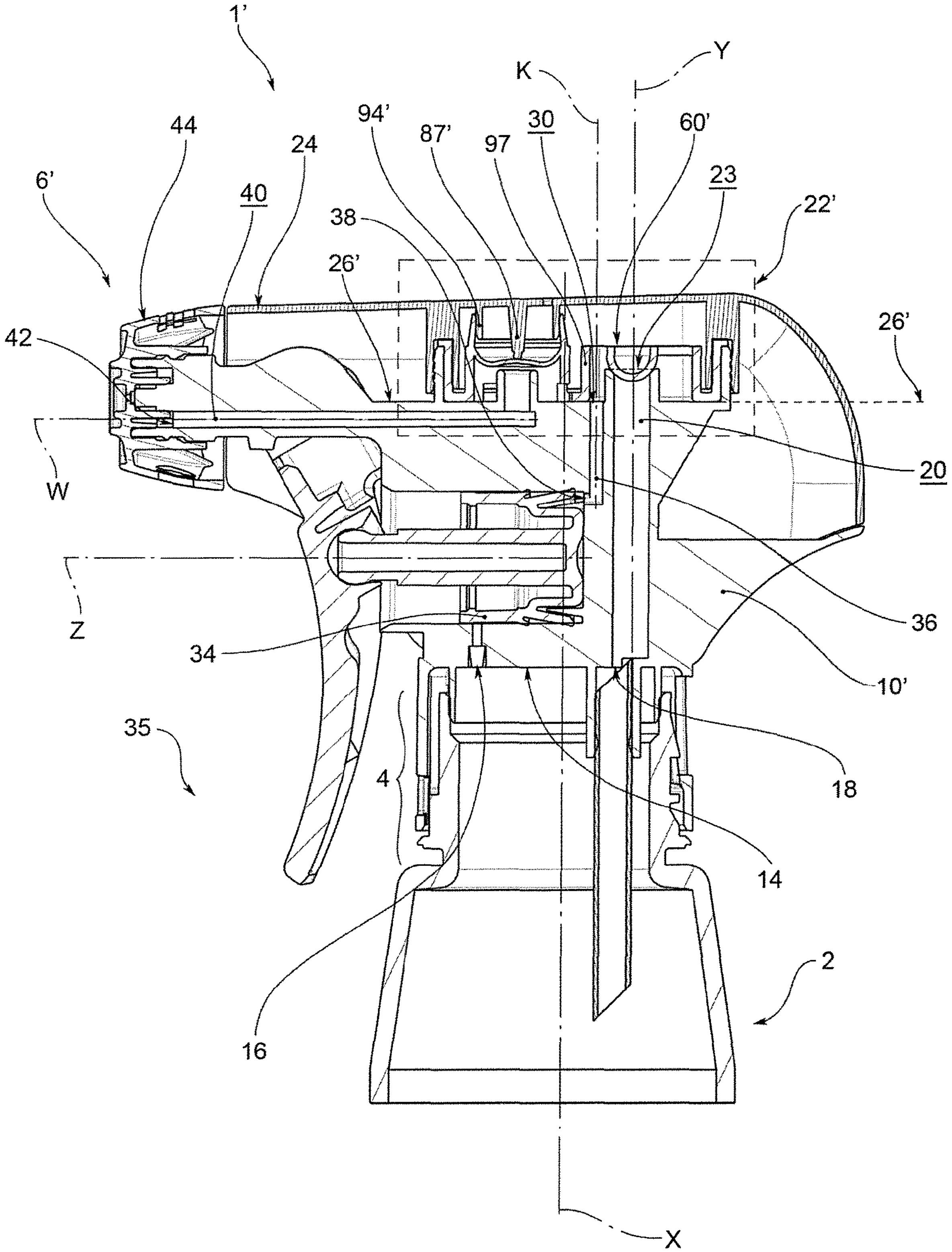
FIG. 11 shows the dispensing head of FIG. 8, in a dispensing configuration.
Figure 12A:
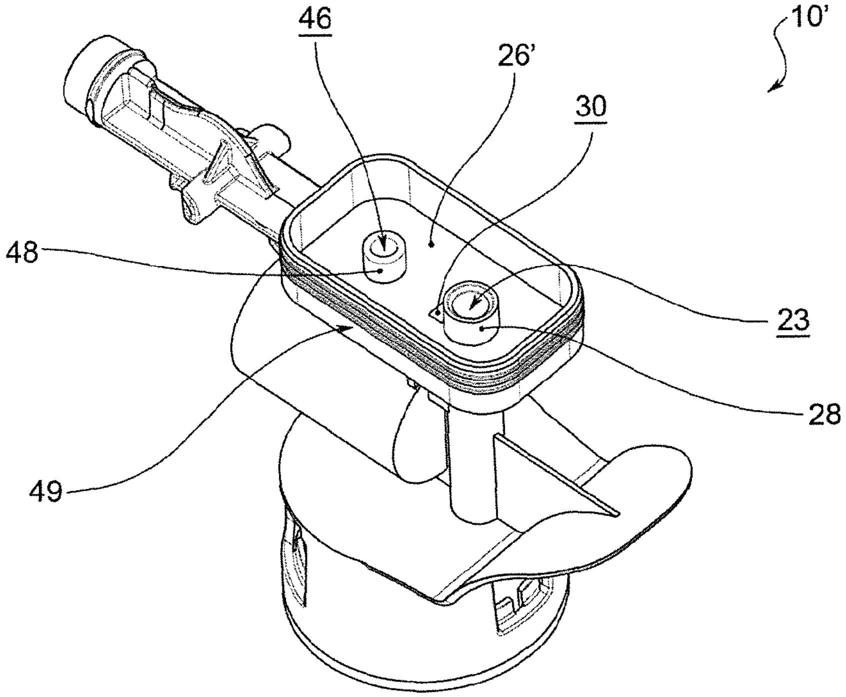
FIGS. 12*a* and 12*b* show a frame of the dispensing head of FIG. 8.
Figure 12B:
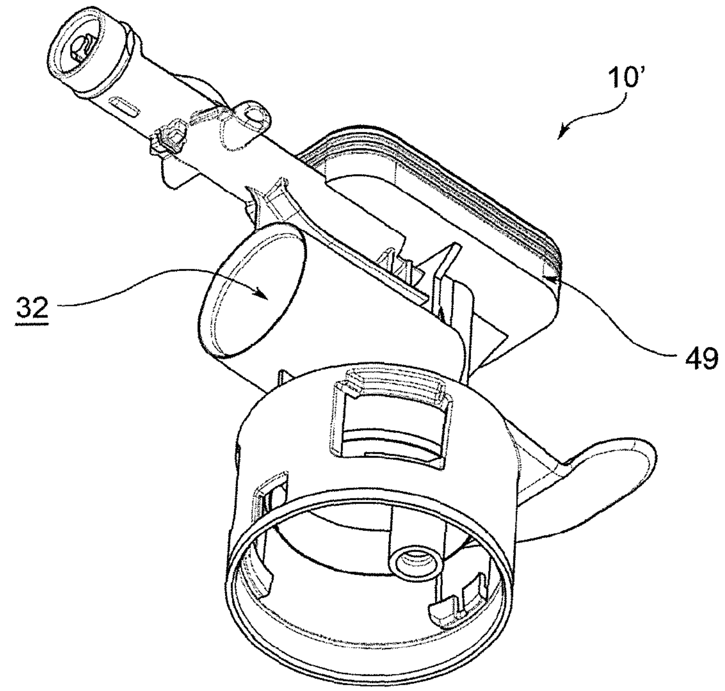
Figure 13A:
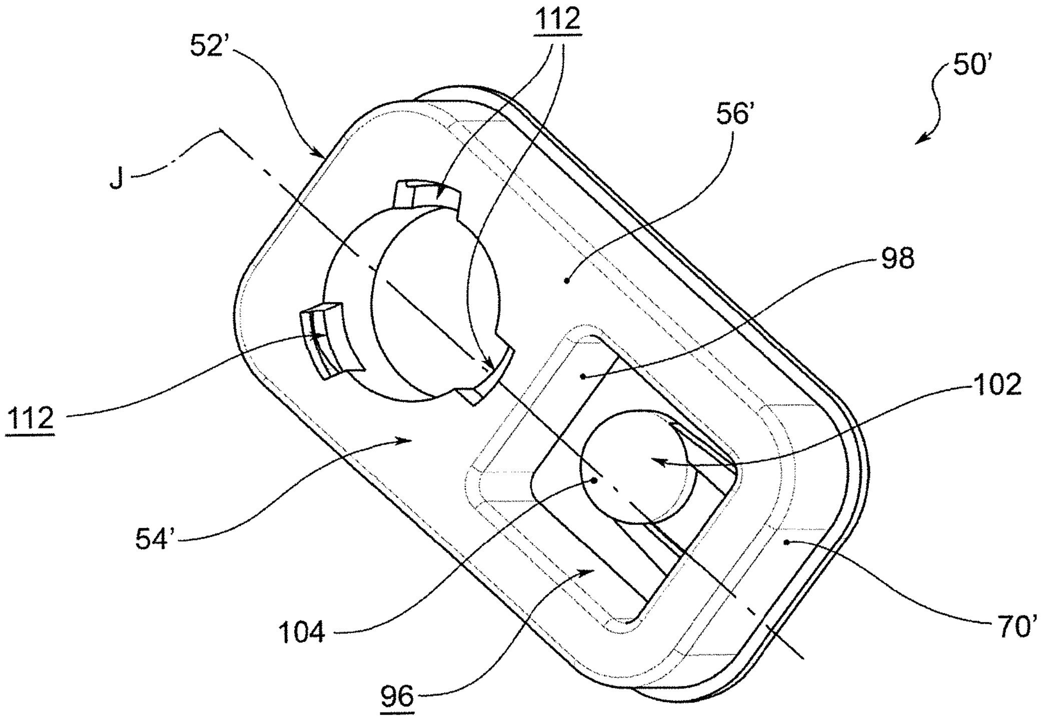
FIGS. 13*a* and 13*b* show valve means of the dispensing head of FIG. 8.
Figure 13B:
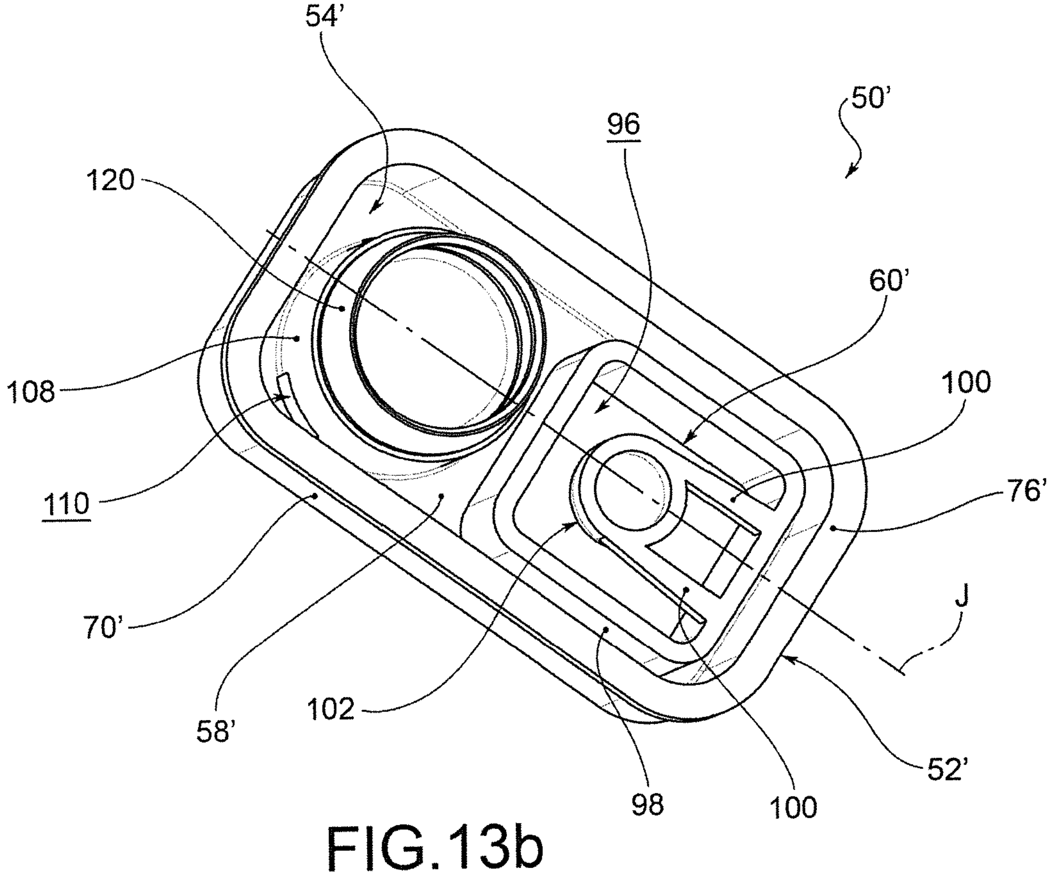
Figure 14:
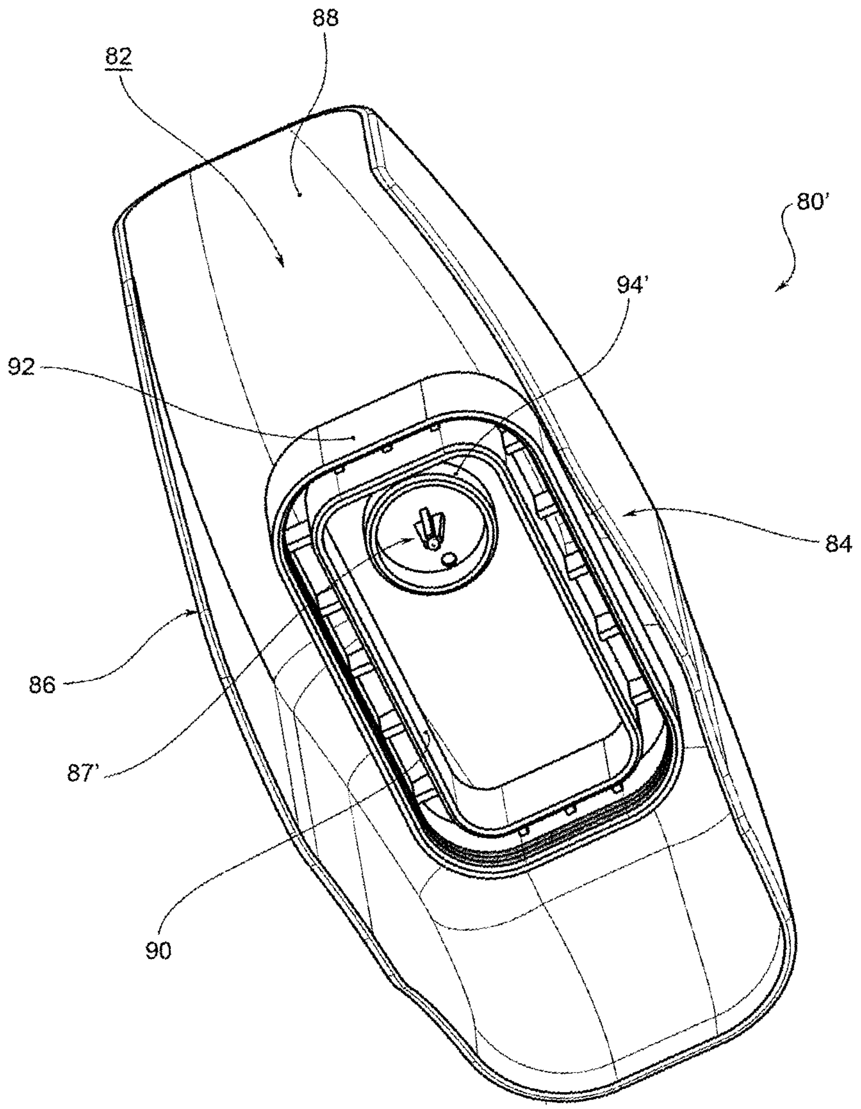
FIG. 14 shows a cover of the dispensing head of FIG. 8.

According to a further embodiment of the invention (FIGS. 8 to 14), a trigger dispenser 1' comprises a dispensing head 6' and has structural and functional features similar to those illustrated for the above embodiment, except for what will be said hereinafter, using the same numerical references to identify features identical to those described above.

A frame 10' has a functional zone or upper zone 22', intended for connecting the frame 10' with a cover 80', having a reference first plane or upper plane 26'.

A suction shank 28 and a dispensing shank 46 protrude from the upper plane 26' and carry a suction outlet port 23 and a dispensing inlet port 46, respectively.

In this embodiment, the dispensing shank 48 is not surrounded by the constraining wall 51 described for the above embodiment.

The dispensing head 6' comprises valve means 50' comprising a valve body 52' having a base 54' having an outer face 56', which when the valve body 52' is applied to the upper zone 22' of the frame 10', is contact with the upper plane 26', and an opposite inner face 58'.

The base 54' has a wide base opening 96 through its own thickness, surrounded by an annular opening wall 98, which protrudes from the inner face 58'.

The valve body 52' further comprises a suction shutter 60' comprising a cantilever arm 100 (or preferably a pair of arms 100) with respect to the opening wall 98 and a shutter body 102 provided with a convex surface 104, for example hemispherical, suitable for closing the suction inlet port 23.

During the suction step (FIG. 10), the shutter body 102 rises and becomes detached from the edge of the suction inlet port 23 of the suction shank 28, allowing the product coming from the suction duct 20 to pass towards the pressure chamber 32, through the frame port 30 and the main duct 36.

The product fills a well 106 formed by the opening wall 98 and the upper surface 26' and the excess product is poured onto the base 54', from the side of the inner face 58'.

The valve body 52' further comprises an annular chamber wall 108 protruding from the inner face 58' of the base 54', configured in such a way that, applying the valve body 52' to the upper zone 22, said chamber wall 108 surrounds the dispensing shank 48.

The valve body 52' further comprises a dispensing shutter 62 consisting of a flexible membrane 110, having an outer face **110*a* and an inner face 110*b*, supported by the chamber wall 108. At rest, the membrane 110 engages the dispensing shank 48 on the side of the inner face 110*b*, closing the dispensing inlet port 46**.

The upper plane 26', the chamber wall 108 and the membrane 110 define a precompression chamber 59'.

The chamber wall 108 has a plurality of chamber passages 112 through the thickness, such as to put the inner face 58' of the base 54' in communication with the precompression chamber 59'.

The excess product in the well 106, flows onto the inner face 58' of the base 54' and penetrates into the precompression chamber 59' through the chamber passages 112.

During the dispensing step (FIG. 11), when the pressure of the product in the precompression chamber 59 exceeds a predefined threshold value, the membrane 110 rises and becomes detached from the edge of the dispensing inlet port 46, allowing the product to pass towards the dispensing duct 40; during the suction step (FIG. 10), the membrane 110 instead remains adherent to the edge of the dispensing inlet port 46, which thus remains closed, preventing air from the external environment from being suctioned through the dispensing duct 40.

The valve body 52' further comprises an inner perimeter wall 70', protruding from the base 54' from the side of the inner face 58', which surrounds the opening wall 98 and the chamber wall 108; at the end of the inner perimeter wall 72', there is a perimeter shelf 76' protruding externally, orthogonally to the inner perimeter wall 72'; when the valve body 52' is applied to the frame wall 49, the perimeter shelf 76' rests on said frame wall 49, while the inner perimeter wall 70' abuts on the frame wall 49.

The dispensing head 6' also comprises a cover 80' suitable for being applied to the frame 10' to cover the upper zone 22, up to the nozzle 44.

The cover 80' comprises an annular counter-wall 94', for example continuous or continuous in sections, protruding from the inner surface 88, configured so as to overlap the membrane 110, with or without contact.

The valve body 52' further comprises an annular sealing wall 120, protruding from the chamber wall 108, configured to provide a seal with the counter-wall 94' of the cover 80', both in the suction step and in the dispensing step. These features cause the upper face **110*a* of the membrane 110 to be sealedly separated from the suction outlet port 23 and from the frame port 30, in any working condition of the dispensing head, i.e. both during the suction step and during the dispensing step, to prevent the product from accumulating on the concave upper face 110*a***.

The membrane 110, the sealing wall 120, the counter-wall 94' and an auxiliary portion 81' of the cap 82 of the cover 80 define an auxiliary compartment 83' within which the membrane 110 is deformed during the dispensing step.

The cover 80 is also provided with a venting hole 95, made through the thickness of said auxiliary portion 81 of the cover 80; said venting hole 95 allows the escape of the air from the auxiliary compartment 83 during the dispensing step, i.e. during the lifting of the membrane 110.

Said venting hole 95 therefore provides an example of venting means integrated in the cover 80.

The cover 80' further comprises a shutter abutment 87' protruding from the inner surface 88, surrounded by the counter-wall 94', i.e. inside the auxiliary compartment 83'. Said shutter abutment 87' acts as a reference for the membrane 110 in deformation during the dispensing step and therefore provides a further example of abutment means integrated in the cover.

Third Embodiment of the Invention

Figure 15:
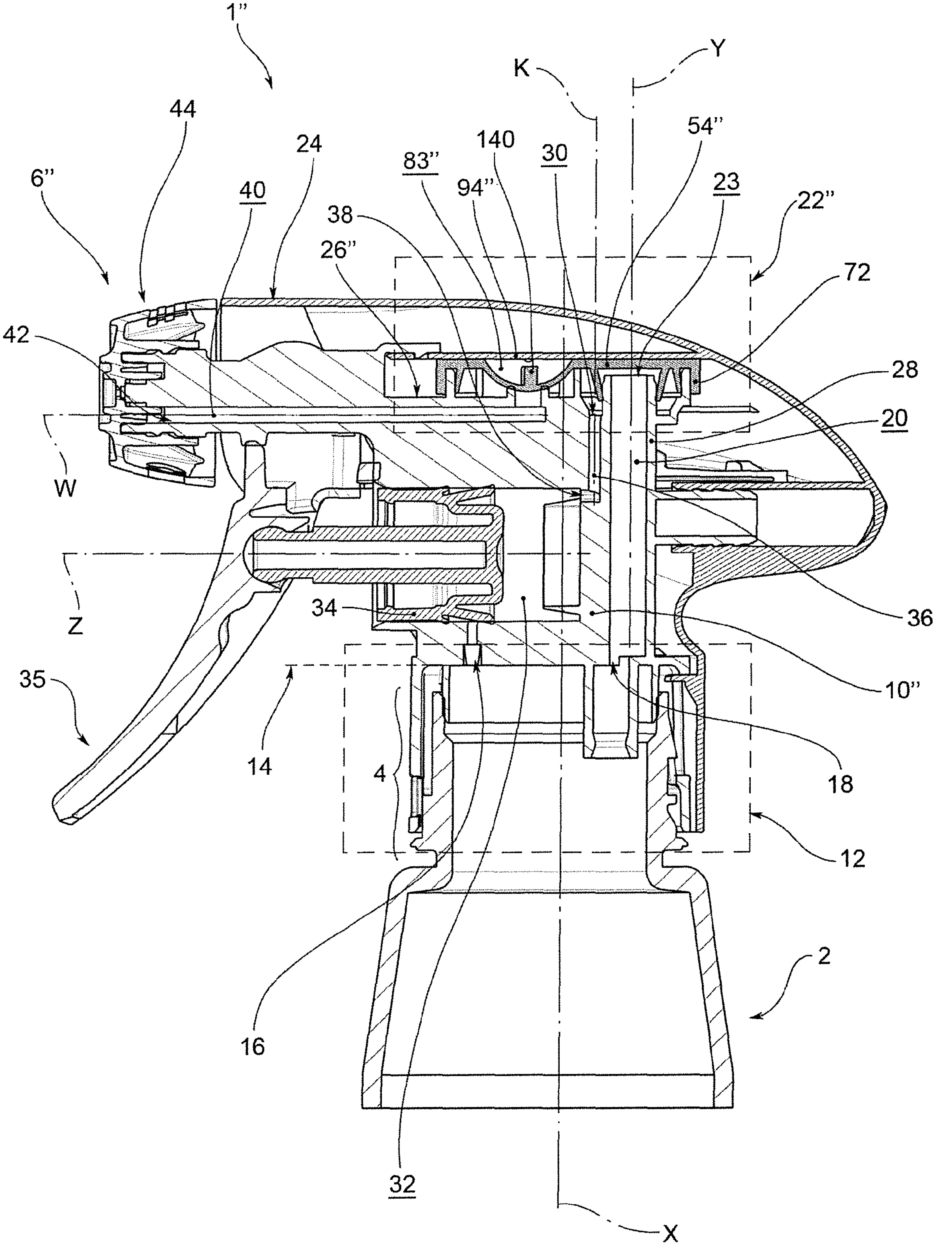
FIG. 15 shows a sectional view of a dispensing head according to yet a further embodiment of the invention, in a rest configuration.
Figure 16:
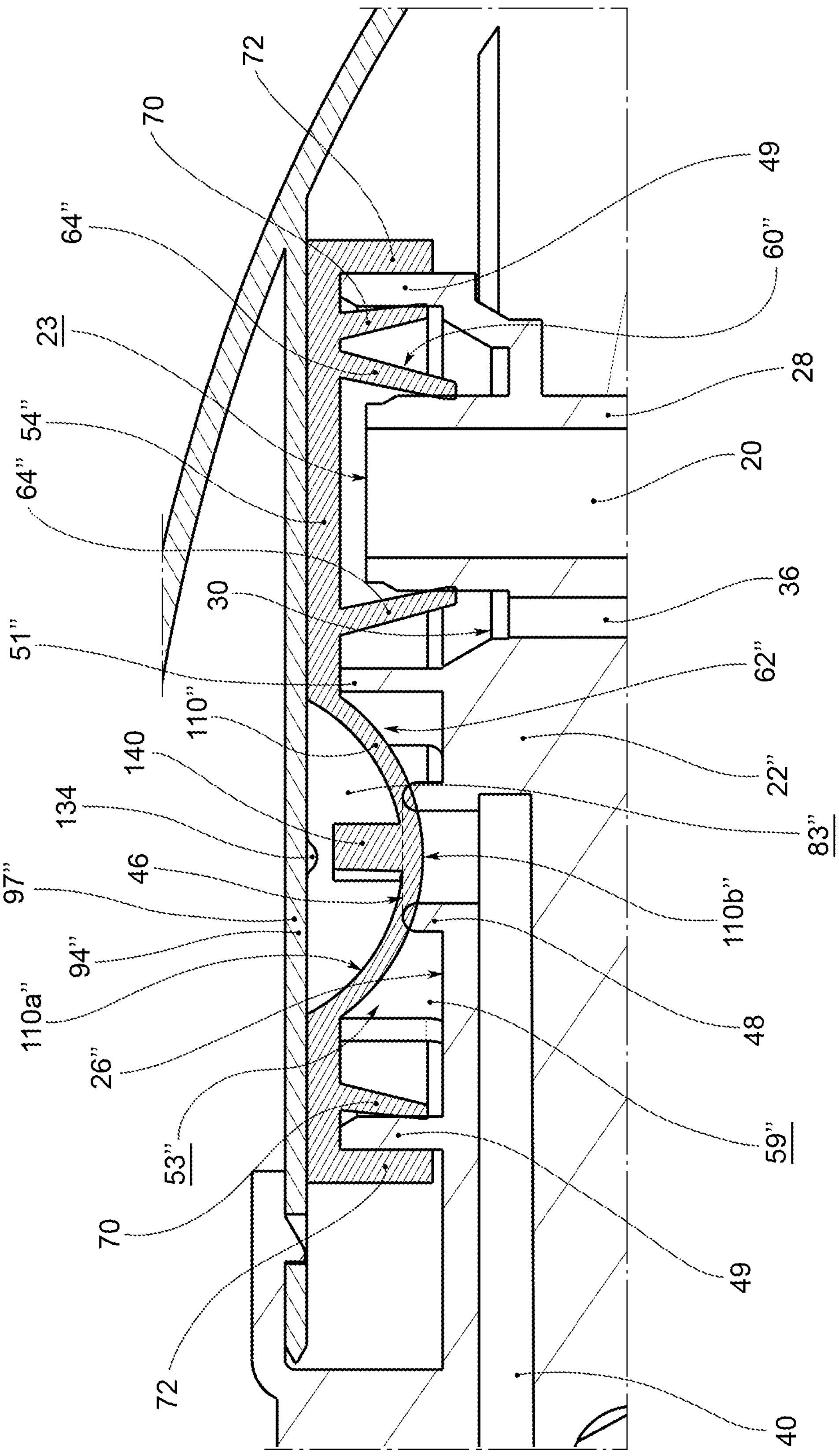
FIG. 16 shows an enlargement of an upper zone of a frame of the dispensing head of FIG. 15.
Figure 17:
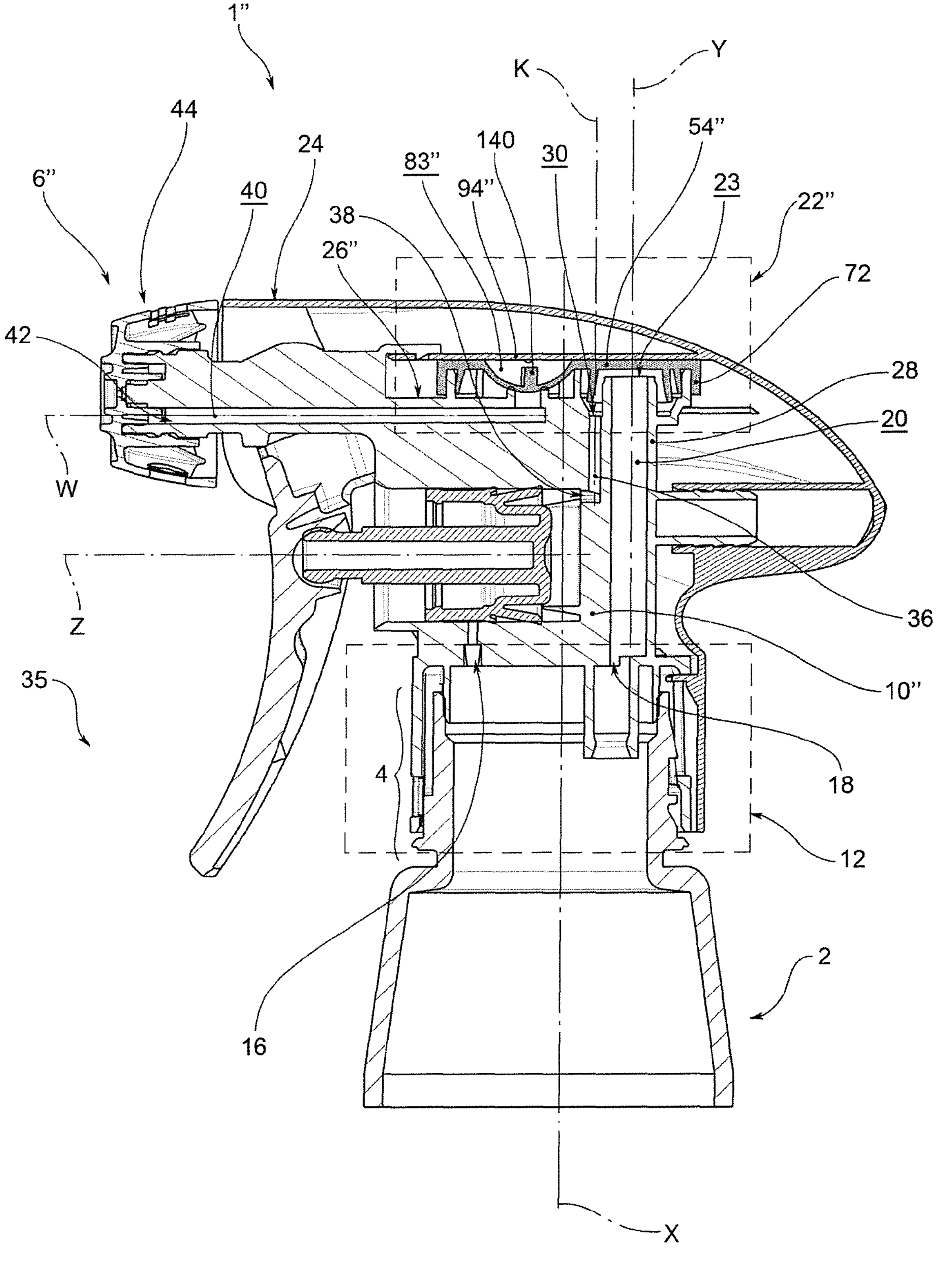
FIG. 17 shows the dispensing head of FIG. 15, in a suction configuration.
Figure 18:
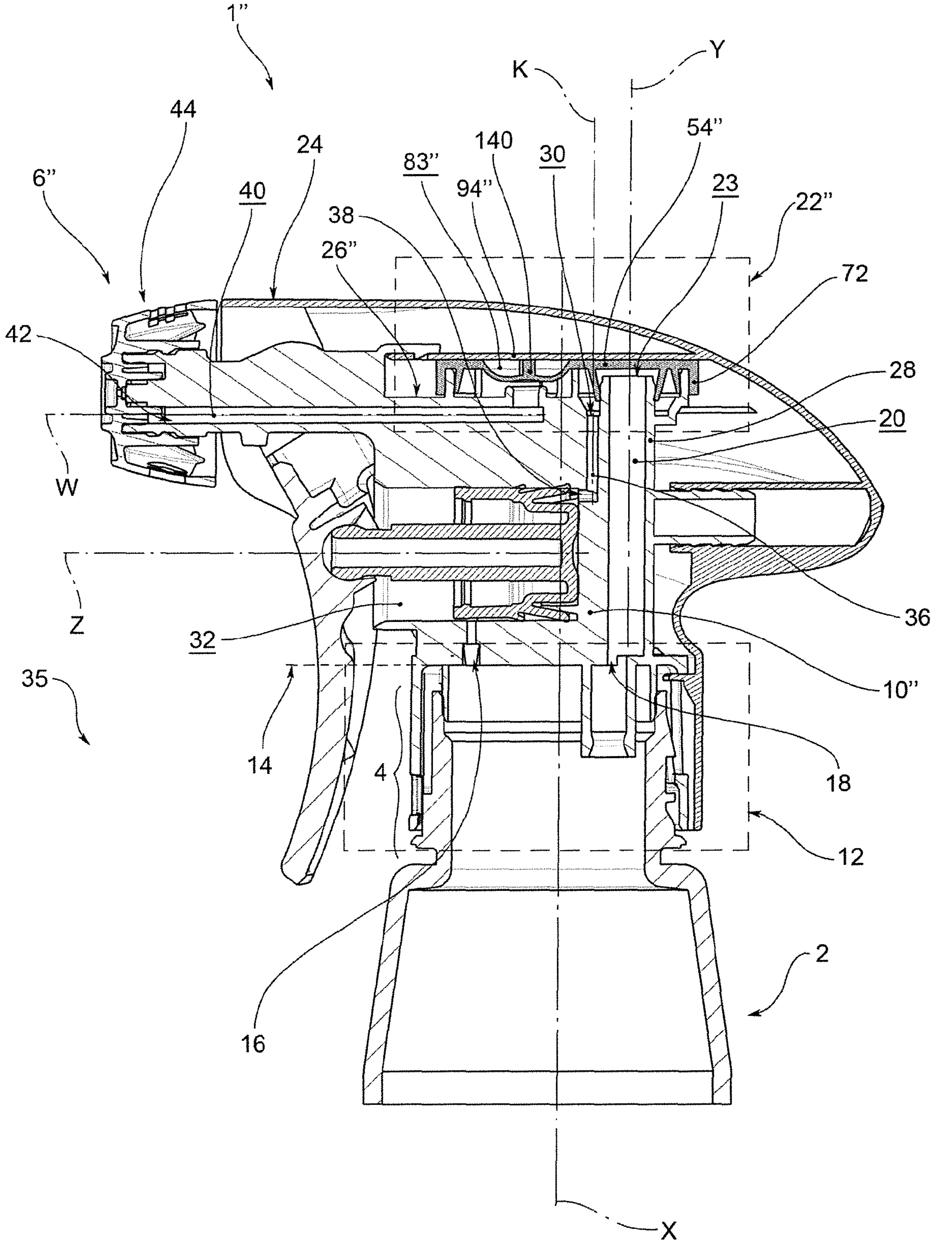
FIG. 18 shows the dispensing head of FIG. 15, in a dispensing configuration.
Figure 19A:
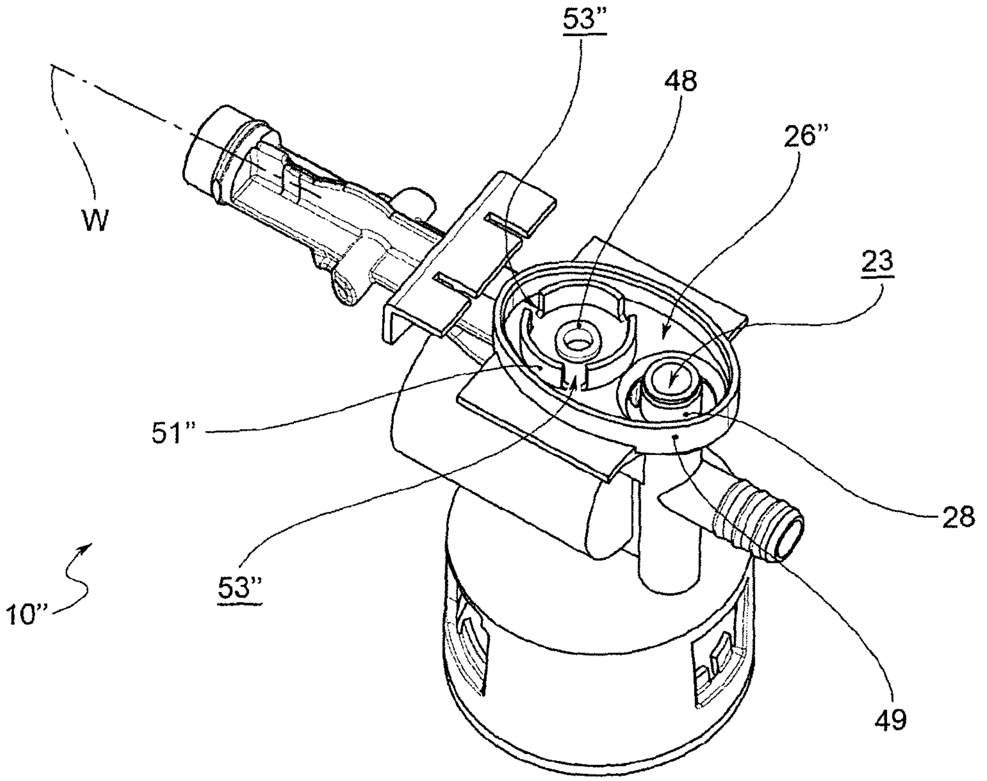
FIGS. 19*a* and 19*b* show a frame of the dispensing head of FIG. 15.
Figure 19B:
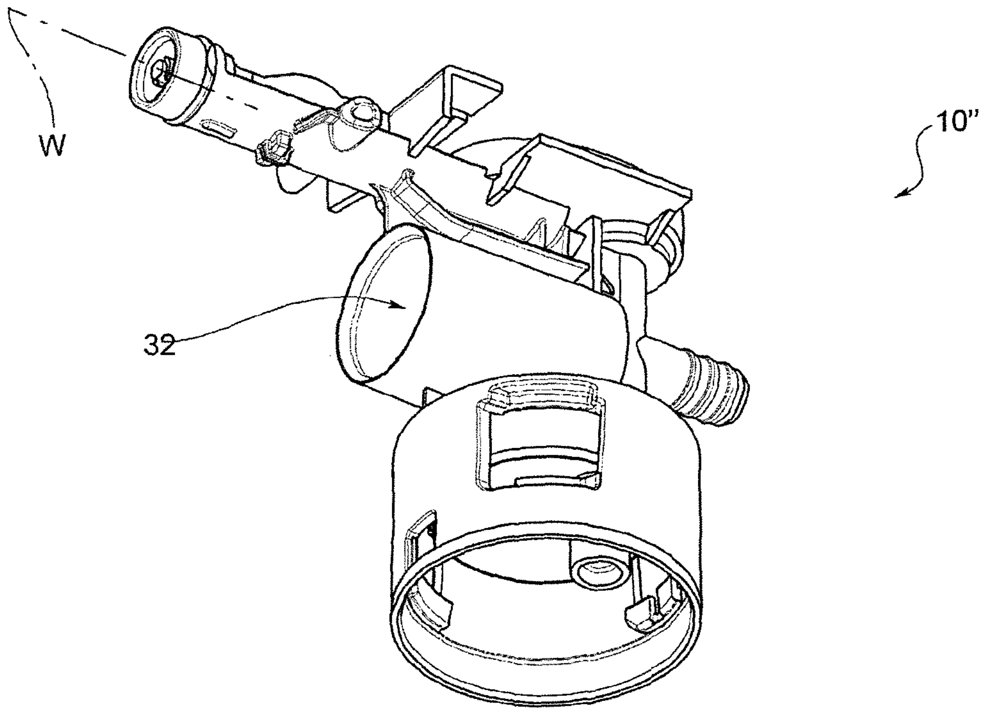
Figure 20A:
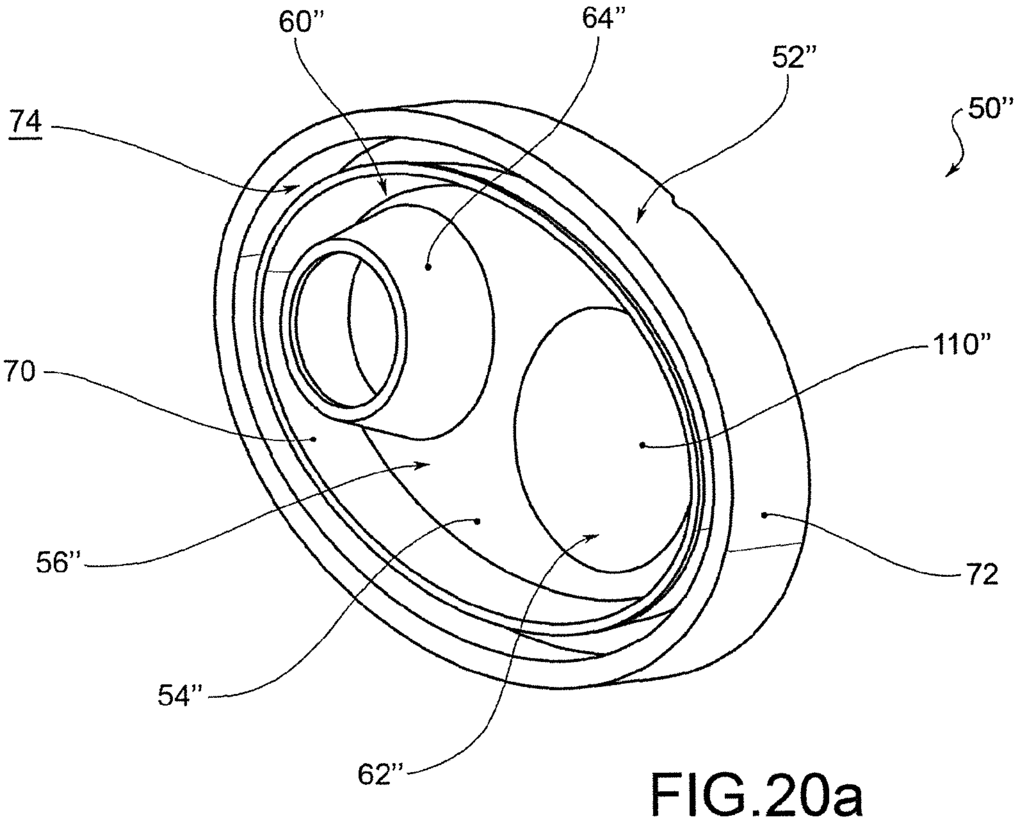
FIGS. 20*a* and 20*b* show valve means of the dispensing head of FIG. 15.
Figure 20B:
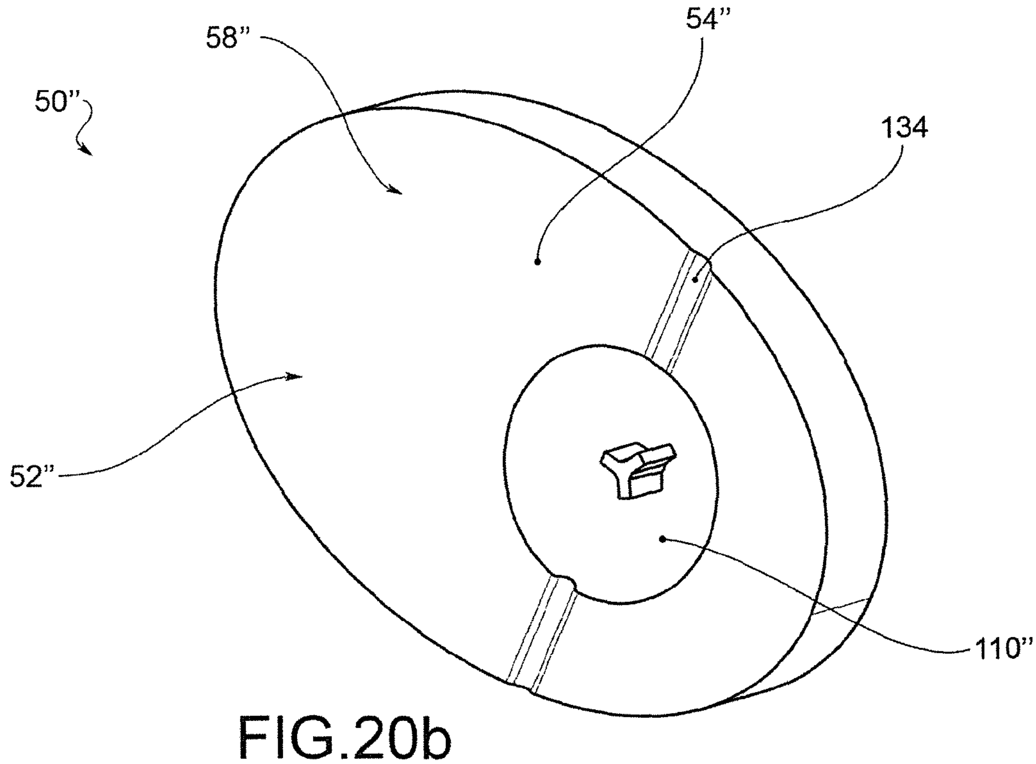
Figure 21:
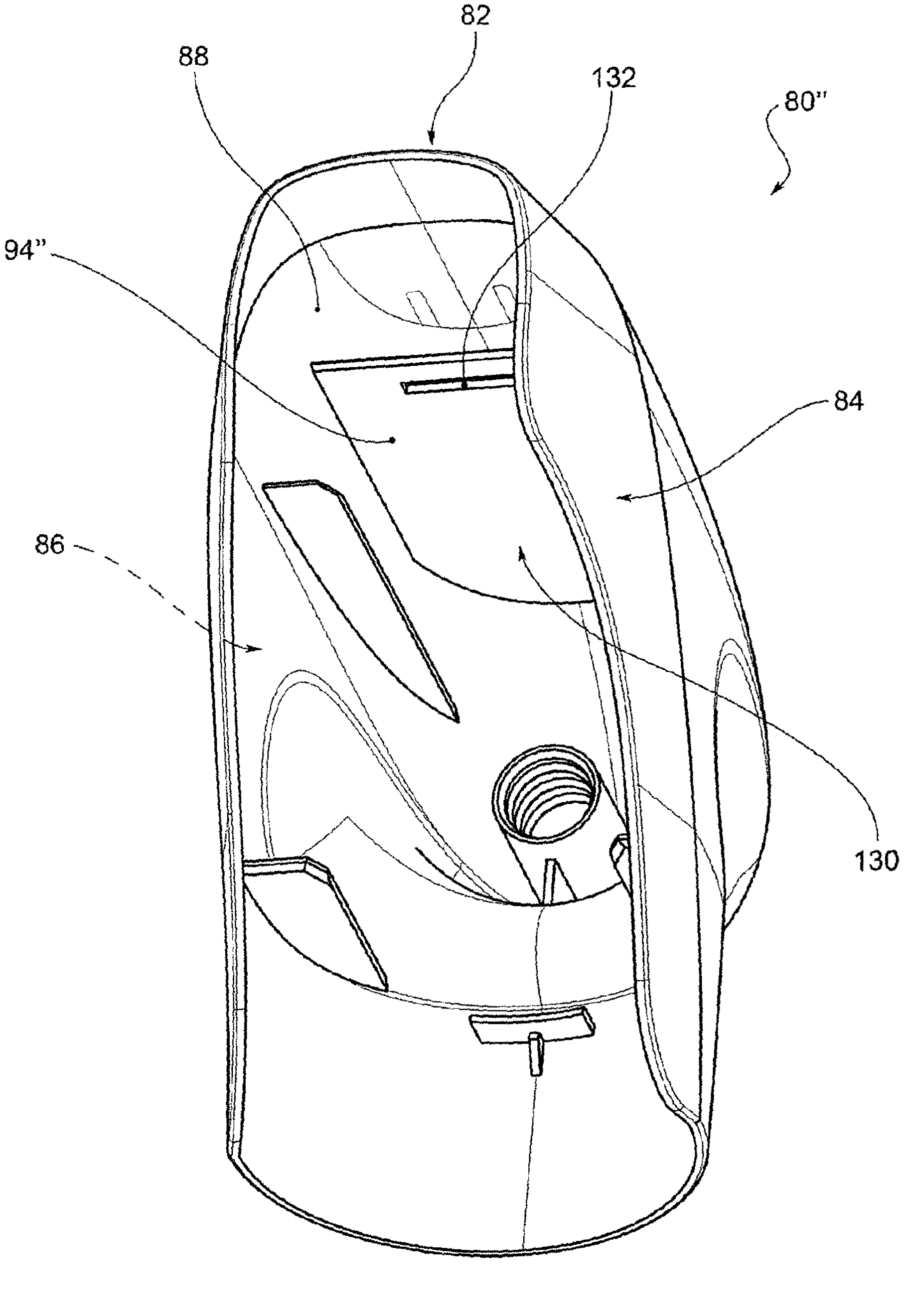
FIG. 21 shows a cover of the dispensing head of FIG. 15.

According to a still further embodiment of the invention (FIGS. 15 to 21), a trigger dispenser 1" comprises a dispensing head 6".

A frame 10" has a functional zone or upper zone 22", intended for connecting the frame 10' with a cover 80", having a reference first plane or upper plane 26".

A suction shank 28 and a dispensing shank 46 protrude from the upper plane 26" and carry a suction outlet port 23 and a dispensing inlet port 46, respectively.

The dispensing shank 48 is surrounded by an annular chamber wall or constraining wall 51", continuous or continuous in sections, continuous provided with openings 53" through the thickness, for example such as to extend over the entire height of said constraining wall 51".

The dispensing head 6" comprises valve means 50" comprising a valve body 52", provided with a bottom 54", having an inner face 56", which when the valve body 52" is applied to the frame 10" is facing the upper plane 26", and an opposite outer face 58".

The valve means 50" also comprise a suction shutter 60" and a dispensing shutter 62", preferably made in a single piece with the valve body 52", protruding from the inner face 56" of the bottom 54".

Preferably, the suction shutter 60" consists of a truncated-cone annular wall 64", adapted to be inserted on the suction shank 28 of the upper zone 22", which is sufficiently flexible to deform due to the suction of the product.

In particular, the suction shank 28 is inserted inside the annular wall 64", which, at rest, adheres to the outer surface of said suction shank 28.

During the suction step (FIG. 17), the annular wall 64" is detached from the outer surface of the suction shank 28, allowing the product coming from the suction duct 20 to pass towards the pressure chamber 32, through the frame port 30 and the main duct 36; during the dispensing step (FIG. 18), the annular wall 64", by the action of the product pressure, adheres to the outer surface of the suction shank 28, preventing the product from returning into the bottle through the suction duct 20.

The dispensing shutter 62 consists of a membrane 110" having an outer face **110*a*" and an inner face 110*b*". The membrane 110" at rest, is adapted to close, from the side of the inner face 110*b*", the dispensing inlet port 46 of the dispensing shank 48**, adhering to the edge thereof.

The constraining wall 51", the membrane 110" and the upper plane 26" delimit a precompression chamber 59", upstream of the dispensing inlet port 46 and downstream of the suction outlet port 23, in communication with the frame port 30 via said openings 53".

During the dispensing step (FIG. 18), when the pressure of the product in the precompression chamber 59" exceeds a predefined threshold value, the membrane 110" rises and becomes detached from the edge of the dispensing inlet port 46, allowing the product to pass towards the dispensing duct 40; during the suction step (FIG. 17), the membrane 110" instead remains adherent to the edge of the dispensing inlet port 46, which thus remains closed, preventing air from the external environment from being suctioned through the dispensing duct 40.

The valve body 52" further comprises:

- an inner perimeter wall 70, protruding from the bottom 54" on the side of the inner face 56", which surrounds the suction shutter 60 and the dispensing shutter 62;
- an outer perimeter wall 72, which surrounds the inner perimeter wall 70, at a predefined distance, so as to form a perimeter pocket 74.

When the valve body 52" is applied to the upper zone 22", the frame wall 49 is inserted into the perimeter pocket 74, tightly sealed.

The dispensing head 6" also comprises a cover 80" suitable for being applied to the frame 10" to cover the upper zone 22", up to the nozzle 44.

The cover 80" comprises a cap 82 and sides 84, 86; the cap 82 has an exposed outer surface and an inner surface 88.

Internally, in front of the inner surface 88 and spaced therefrom it, the cap 80" has a counter-wall 94", which extends parallel to the dispensing axis W, preferably supported by the sides 84, 86.

When the cap 80" is applied to the frame 10", the counter-wall 94" operates on the valve body 52", pushing it towards the frame wall 49, thus fixing the valve body 52" to the frame 10".

Preferably, moreover, the counter-wall 94" can be hooked to the frame 10". For example, the upper zone 22" of the frame 10" has a hooking portion 136 and the counter-wall 94" has a hooking slot 138 at the front, within which the hooking portion 136 snaps.

The membrane 110" and an auxiliary portion 97" of the counter-wall 94" define an auxiliary compartment 83" within which the membrane 110" is deformed during the dispensing step.

The valve body 52" has, on the outer face 58", a transverse groove 134, preferably positioned so as to ideally intercept the projection of the membrane 110" on the outer face 58", so as to be able to discharge the air from the auxiliary compartment 83" towards the environment during the deformation of the membrane 110".

The groove 134 implements an example of venting means integrated in the valve body, suitable for discharging the air during the dispensing step.

The valve body 52'" further comprises a body abutment 140 protruding from the outer face **110*a*" of the membrane 110" which implements a travel end abutment against the counter-wall 94" for the membrane 110"** during the dispensing step.

Said body abutment 140 implements an example of abutment means integrated in the valve body 52".

Advantageously, the cover 80" is applicable to the frame 10" by relative sliding parallel to the dispensing axis W, considerably simplifying the assembly operations of the dispensing head.

Further Embodiments of the Invention

According to a further embodiment variant of the trigger dispenser, the piston is replaced by a deformable cap membrane.

According to a further variant, the trigger is engaged with the frame so as to be translatable.

According to a still further variant, the valve means comprise two separate valve bodies, each of which carries the respective dispensing shutter and suction shutter.

Innovatively, the dispensing head according to the present invention meets the needs of the sector and overcomes the aforementioned drawbacks.

Such a dispensing head allows having a precompression of the product before dispensing, while maintaining a simple structure.

Advantageously, moreover, the assembly of the dispensing head is particularly fast, thus positively influencing the production times.

It is clear that a man skilled in the art may make changes to the dispensing head described above in order to meet incidental needs, all falling within the scope of protection defined in the following claims.

The invention claimed is:

1. A dispensing head for a trigger dispenser, applicable to a bottle containing a product to be dispensed, said dispensing head comprising:

a frame for supporting components of the dispensing head, comprising a functional zone comprising a first reference plane, a frame port, a suction outlet port and a dispensing inlet port opening on said functional zone;

a pressure chamber operatively connected to the frame port;

a trigger to pressurize the product in the pressure chamber;

a suction duct ending with the suction outlet port for transporting the product suctioned from the bottle;

a dispensing duct extending from the dispensing inlet port along a dispensing axis (W), for dispensing the product to external environment; and a valve device applied to the functional zone, comprising a suction shutter cooperating with the suction outlet port and a dispensing shutter cooperating with the dispensing inlet port to carry out a precompression of the product before dispensing;

wherein said valve device cooperates with the first reference plane of the frame to form a precompression chamber upstream of the dispensing inlet port, which can be fed by the product exiting from the frame port, wherein said functional zone comprises an annular chamber wall that is provided with openings passing through a thickness, the annular chamber wall surrounding the dispensing inlet port and at least partially delimiting said precompression chamber, and wherein the valve device comprises a valve body provided with a membrane that delimits at a top said precompression chamber, resting on the annular chamber wall.

2. The dispensing head of claim 1, wherein the valve device is made in a single piece.

3. The dispensing head of claim 1, wherein the functional zone comprises an annular frame wall that peripherally surrounds the first reference plane;

the valve device comprises an inner perimeter wall that surrounds the suction shutter and the dispensing shutter; and the inner perimeter wall abuts against the annular frame wall to apply the valve device to the functional zone.

4. The dispensing head of claim 1, wherein the valve device comprises a valve body provided with a bottom that delimits at the top said precompression chamber, resting on the annular chamber wall.

5. The dispensing head of claim 1, wherein said membrane forms said dispensing shutter.

6. The dispensing head of claim 4, wherein the suction shutter consists of a truncated-cone annular wall, configured to deform due in response to suction of the product, protruding from the bottom.

7. The dispensing head of claim 1, further comprising a cover covering the functional zone and comprising an inner wall and an outer wall configured to connect the valve device to the functional zone.

8. The dispensing head of claim 7, wherein the cover internally comprises a counter-wall that extends parallel to the dispensing axis (W), configured to operate on the valve device for connecting the valve device to the frame.

9. The dispensing head of claim 8, wherein the cover is applicable to the frame by relative sliding parallel to the dispensing axis (W).

10. The dispensing head of claim 1, further comprising a cover covering the functional zone and comprising an inner wall and an outer wall configured to connect the valve device to the functional zone, and further comprising at least one venting hole for letting air escape from an auxiliary compartment, wherein the dispensing shutter is deformed during a dispensing step.

11. The dispensing head of claim 1, further comprising a cover covering the functional zone and comprising an inner wall and an outer wall configured to connect the valve device to the functional zone, and further comprising at least one abutment integrated in the cover and suitable for implementing a travel end abutment for the dispensing shutter during a dispensing step.

12. The dispensing head of claim 1, wherein a main duct extends along a main duct axis (K) and the suction duct extends along a suction axis (Y), wherein the main duct axis (K) is parallel to and spaced from the suction axis (Y).

13. The dispensing head of claim 12, wherein the dispensing duct extends along the dispensing axis (W), orthogonal to the suction axis (Y) and to the main duct axis (K).

14. The dispensing head of claim 12, wherein the pressure chamber, the main duct, the suction duct and the dispensing duct are formed in the frame and said frame is made in a single piece.

* * * * *